United States Patent
Politis et al.

(10) Patent No.: US 6,236,410 B1
(45) Date of Patent: May 22, 2001

(54) EFFICIENT METHODS FOR THE EVALUATION OF A GRAPHICAL PROGRAMMING LANGUAGE

(75) Inventors: George Politis, Macquarie Fields; Andrew Timothy Robert Newman, Surry Hills; Timothy Merrick Long, Lindfield, all of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/267,341

(22) Filed: Mar. 15, 1999

Related U.S. Application Data

(63) Continuation of application No. 08/851,268, filed on May 5, 1997, now abandoned, which is a continuation of application No. 08/697,683, filed on Aug. 28, 1996, now abandoned, which is a continuation of application No. 08/504,414, filed on Jul. 20, 1995, now abandoned.

(51) Int. Cl.[7] .................................................. G06F 15/00

(52) U.S. Cl. ............................................................. 345/440

(58) Field of Search .................................... 345/440, 441, 345/433, 434, 117, 118

(56) References Cited

U.S. PATENT DOCUMENTS

| | | | |
|---|---|---|---|
| 5,307,452 | 4/1994 | Hahn et al. | 395/132 |
| 5,442,738 | 8/1995 | Chapman et al. | 345/135 |
| 5,877,775 | * 3/1999 | Theisen et al. | 345/440 |

FOREIGN PATENT DOCUMENTS

| | | |
|---|---|---|
| 0528631 | 2/1993 | (EP) . |
| 0647921 | 4/1995 | (EP) . |

OTHER PUBLICATIONS

Cameron, Stephen, "Efficient Bounds in Constructive Solid Geometry", IEEE Computer Graphics and Applications, vol. 11, No. 3 (May 1991), pp. 68–74.

William M. Newman and Robert F. Sproull, "Solid–Area Scan Conversion", Principles of Interactive Computer Graphics, McGraw Hill 1979, 1973, pp. 229–243.

"A Model For Efficient and Flexible Image Computing", M. A. Shantzis, Computer Graphics Proceedings, Annual Conference Series, 1994, pp. 147–154.

"Merging and Transformation of Raster Images for Cartoon Animation", Bruce A. Wallace—Computer Graphics vol. 15, No. 3, Aug. 1981.

(List continued on next page.)

*Primary Examiner*—Phu K. Nguyen
(74) *Attorney, Agent, or Firm*—Fitzpatrick Cella Harper & Scinto

(57) ABSTRACT

A system, method and language for compositing or creating images is disclosed. The images typically comprise a plurality of graphical elements each including color and opacity information. The system utilizes operators having the graphical elements as operands in which the operators combine the operands according to a function defined by the operators, the color information, and the opacity information, to produce new graphical elements. One part of the system includes interpreting the language by parsing and executing a sequence of statements and forming an expression tree the nodes of which comprise the graphical elements. Instructions are then derived from the tree. Another part permits the compositing of opaque graphical elements and associated clipping operations. Bounding box method are used for locating active areas of graphical elements from the nodes. Manipulation of the expression tree is used to reduce the expected execution time of the compositing commands. An architecture is disclosed for implementing the system.

19 Claims, 15 Drawing Sheets

OTHER PUBLICATIONS

"Compositing Digital Images", Thomas Porter and Tom Duff—Computer Graphics vol. 18, No. 3, Jul. 1984.

"A Language for Bitmap Manipulation", Leo J. Guibas and Jorge Stolfi—ACM Transactions on Graphics, vol. 1, No. 3, Jul. 1982, pp. 191–214.

"A Model for Efficient and Flexible Image Computing", Michael A. Shantzis, Computer Graphics Proceedings, Annual Conference Series, 1994, p. 147.

IEEE Computer Graphics and Applications, Mar. 1991, USA, vol. 11, No. 2, ISSN 0272-1716, pp. 71–78, XP002003654, Schonut J et al: "Constructive Page Description".

Proceedings of the 1990 IEEE Workshop on Visual Languages (Cat. No. 90TH0330-1), Skokie, IL, USA, Oct. 4–6, 1990, ISBN 0-8186-2090-0, 1990, Los Alamitos, CA, USA, IEEE Comput. Soc, USA, pp. 86–91, XP002003655 Williams C S et al: "A Visual Language for Image Processing".

Computer Communications, vol. 12, No. 2, Apr. 1, 1989, pp. 85–92, XP000120295, Robinson P J. et al: "Standard Page Description Language".

\* cited by examiner

EFFICIENT METHODS FOR THE EVALUATION OF A GRAPHICAL PROGRAMMING LANGUAGE

This application is a continuation of U.S. patent application No. 08/851,268, filed May 5, 1997, now abandoned, which is a continuation of U.S. patent application No. 08/697,683, filed Aug. 28, 1996, now abandoned, which is a continuation of U.S. patent application No. 08/504,414, filed Jul. 20, 1995, now abandoned.

FIELD OF THE INVENTION

The present invention relates to the creation of computer generated images both in the form of still pictures and video imagery and, in particular relates to the compositing process of creation of an image made up from multiple sub components.

BACKGROUND ART

Computer generated images are typically made up of many differing components or graphical elements which are "composited" or rendered together to create a final image. An image is separated into its constituent elements so that they can be independently rendered, thereby potentially saving large amounts of time due to the use of smaller image fragments. Each element or object has associated with it a particular matte or "Alpha Channel" information which generally includes coverage information designating the shape and transparent nature of the element. The matte or Alpha Channel information is normally stored separately for each pixel. Each pixel additionally normally stores the color components (for example Red, Green, Blue (RGB)) also for each pixel. Therefore, each pixel of an element can be represented by the quadruple (R, G, B, α) where α represents the transparency of an element and is known generally as the "Alpha" or opacity channel. As an example, if black of represented by the RGB color components 0,0,0, then the color black can be represented by the quadruple 0,0,0,1) and a clear or totally transparent color can be represented by the quadruple 0,0,0,0).

Furthermore it is sometimes advantageous to "premultiply" the color components by their opacity. In this case the color (R, G, B) is represented by (R, G, B) (αR, αG, αB).

Referring now to FIGS. 1 to 3 there will now be shown a simple example of image composition. In FIG. 1 there is shown an example of a circular graphical element 1 whose outline is defined by the edge of the circle. Inside the circle there is defined a particular color or variation thereof 2. The exterior 3 of the circular border is assumed to be of infinite extent and is defined to take an alpha value of zero (ie. invisible). In FIG. 2 there is shown a second circular graphical element 4 having a different color 5 from the color of the element 1 of FIG. 1. In FIG. 3, there is shown an example of a more complex image 6 formed from the compositing of one copy of each of the elements, 1, 4 of FIGS. 1 and 2 on to a page. An overlap portion 7 is defined to be a combination of the two elements 1, 4 and takes a color value which is dependent on the compositing operators combining the two elements to create a more complex image 6.

Thomas Porter and Tom Duff, in an article entitled "Compositing Digital Images" appearing in Computer Graphics, Vol. 18, No. 3, July 1984 at pages 253–259 set out a method for compositing elements together to form "superelements". Porter and Duff also discuss methods of combining two images wherein both images have an "α" channel. There are 13 main compositing operations for combining two portions of a single image. The function of each of those compositing operations is as set out in Table 1 below where $D_c$ is the premultiplied destination or resultant color, $D_o$ is the destination or resultant α channel value, $A_c$ is the premultiplied pixel color of a first portion of a first source A, $A_o$ is the α value corresponding to the pixel whose color is $A_c$, $B_c$ is the premultiplied pixel color value of a portion of an image of a second source B, and $B_o$ is the α channel value of the pixel corresponding to $B_c$ of the source B.

TABLE 1

Compositing Operations

| OPERATION | EQUATION |
| --- | --- |
| clear | $D_c = 0$ |
|  | $D_o = 0$ |
| A | $D_c = A_c$ |
|  | $D_o = A_o$ |
| B | $D_c = B_c$ |
|  | $D_o = B_o$ |
| A over B | $D_c = A_c + B_c(1 - A_o)$ |
|  | $D_o = A_o + B_o(1 - A_o)$ |
| A rover B | $D_c = A_c(1 - B_o) + B_c$ (Reverse case of A over B) |
|  | $D_o = A_o(1 - B_o) + B_o$ |
| A in B | $D_c = A_c B_o$ |
|  | $D_o = A_o B_o$ |
| A rin B | $D_c = A_o B_c$ (Reverse case of A in B) |
|  | $D_o = A_o B_c$ |
| A out B | $D_c = A_c(1 - B_o)$ |
|  | $D_o = A_o(1 - B_o)$ |
| A rout B | $D_c = B_c(1 - A_o)$ (Reverse case of A out B) |
|  | $D_o = B_o(1 - A_o)$ |
| A atop B | $D_c = A_c B_o + B_c(1 - A_o)$ |
|  | $D_o = A_o B_o + B_o(1 - A_o)$ |
| A ratop B | $D_c = A_c(1 - B_o) + B_c A_o$ |
|  | $D_o = A_o(1 - B_o) + B_o A_o$ |
| A xor B | $D_c = A_c(1 - B_o) + B_c(1 - A_o)$ |
|  | $D_o = A_o(1 - B_o) + B_o(1 - A_o)$ |
| A plusW B | $D_c = A_c + B_c$ (with $D_c$ "wrap around") |
|  | $D_o = A_o + B_o$ (with $D_o$ "wrap around") |
| A plusC B | $D_c = A_c + B_c$ (with $D_c$ "clamped") |
|  | $D_o = A_o + B_o$ (with $D_o$ "clamped") |

In Table 1 there are shown various methods for combining two different images together utilising different operators. Additional operators to those used above are possible. The additional operators can be mainly utilized to implement special effects.

The "wrap around" nature of the "plusW" operator means that when, for example, the addition of $A_c+B_c$ is greater than a maximum value of a color component, the value is "wrapped around" to start again with reference to the minimum value in the color space. Alternatively, the process of "clamping" utilized by "plusC" involves clamping the addition of, for example, $A_c+B_c$ to the maximum value of a color component when the addition is greater than this component.

Referring now to FIG. 4, there are shown various examples of the final image which is created when various operations as set out in Table 1 are utilized in the compositing of two fully opaque circles A and B. It should be noted that the operators "rover", "rin", "rout" and "ratop" are equivalent to the swapping of the operands to the "r" (reverse) operator and applying the corresponding operator "over", "in", "out" and "atop" respectively.

Recently, graphics languages in the form of page description languages such as POSTSCRIPT (Trade Mark) have become available. These language offer the full functionality of a relatively complex programming language, thereby allowing complex images to be described compactly through the use of notions of iteration, control flow and procedural definition of image elements. These page description languages were developed to insulate the application writer from any machine dependent details of printers, thereby aiding portability. These languages offer extensive support for text, spline-based graphical objects and sampled images. An interpreter for the language can then be constructed and reside in, for example, a printing device, allowing a complex image to be represented compactly. Additionally, page description languages aid in portability from one output device to another, as the interpretation of the language can be machine independent. Languages such as POSTSCRIPT were originally constructed to describe the appearance of a bit map page or screen and utilize certain graphic primitives that are based on the notion of painting with opaque paint on the bit map image.

As in most programming languages, page description languages often consist of operands and operators which act on the operands to produce new results or effects. The operands may sometimes include fundamental graphical entities such as a line, an arc, a curve, a collection of lines and splines, a string of text, or a sampled image, and are designed to be operated on by the operators. The operators can be classified into many different categories including the following:

1. Operators which determine current attributes of various operands or global status variables.
2. Operators which alter the various coordinate systems in which fundamental entities are to be defined.
3. Path operators which update certain basic entities to define various paths, thereby allowing the construction of complex objects.
4. Various "rendering" operators which generate image data that eventually determines the color of the individual dots which appear on an output page.
5. A special class of operators is normally used for specifying, modifying and selecting text or fonts. This is due to the special nature of character fonts which are pre-prepared and in constant use.
6. Various device setup and output operators which can be utilized to control the outputting of an image to a display device such as a printer or screen.

Unfortunately, languages such as POSTSCRIPT and the like rely on a "device model" directed to the painting with opaque paint on a frame buffer or the like. The use of a frame buffer requires excessive amounts of storage, and, with modern imaging techniques requiring high quality output, this can often lead to excessive amounts of storage and computation being required to create an image. Additionally, the inefficiencies in the use of painting techniques becomes accennuated with increase output resolutions.

SUMMARY OF THE INVENTION

It is an object of the present invention to provide an improved form of creation of images through the interpretation of a program defined in a graphical programming language.

According to an aspect of the present invention there is provided a method of interpreting a program defined in a graphical programming language, said method comprising:
parsing and executing a sequence of statements, said statements including the combining or rendering of graphical elements;
converting said combining or rendering of graphical elements to be nodes of an expression tree wherein the descendants of said nodes are the operands of a deferred combining or rendering of graphical elements and the node is marked as having a deferred operation; and
producing, from said expression tree, a series of instructions corresponding to said sequence of statements, said instructions having one operand operating on a plurality of operators.

BRIEF DESCRIPTION OF THE DRAWINGS

The preferred embodiment of the present invention will now be described with reference to the accompanying drawings in which.

DETAILED DESCRIPTION OF THE PREFERRED EMBODIMENT

Figure 1:
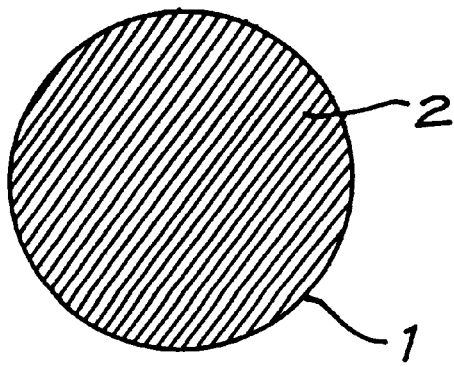
FIGS. 1 and 2 illustrate two simple graphical elements.
Figure 2:
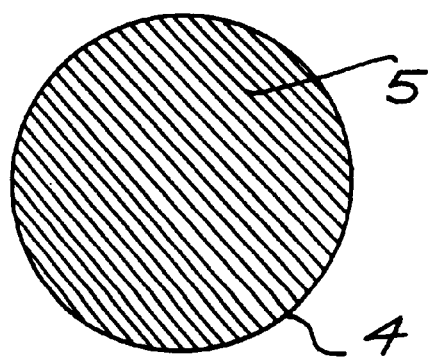
Figure 3:
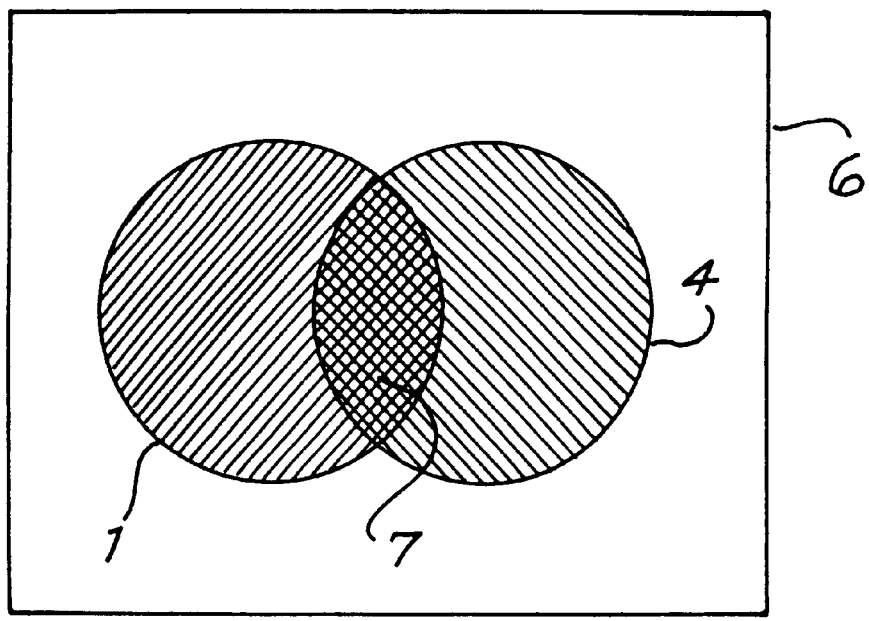
FIG. 3 illustrates the composition of graphical elements.

In the preferred embodiment, the described programming language has the following advantageous features:
1. Graphical elements and their combination are data types of the language and arbitrary combinations of graphical elements are possible.
2. Graphical operators take graphical elements as their operands and evaluate new graphical elements, or combinations thereof.
3. Graphical objects may be used in the same way as other standard language data types, subject to the type restrictions of any operators with which they are involved (for instance the division operator only operates on arithmetic operands, however the assignment operator works for any operand types).
4. All graphical elements and the results of combinations of graphical elements using graphical operators are suitable operands for further graphical operations.
5. An image can be produced for output by the rendering of a specific graphical element which has been produced by the execution of the page description program.

In the preferred embodiment, the base graphical elements are constructed from the following "primitive types":
1. Text including a variety of fonts specified at various sizes.
2. Objects whose outlines are defined by spline data, also known as paths.
3. Pixel data such as scanned images or previously composed images which themselves form graphical elements.
4. A graphical element known as "all" which is used as the background of a page and should be at least as large as the image being created.

Color and text graphical elements can include attributes which include:
 (a) color, whether a solid color, a blend between two colors, or a repeating pixel-based tile,
 (b) opacity, or α channel data, with the same possible options of variation as color data, and
 (c) filling and/or stroking data controlling the rendering of the paths or text graphical element. A "graphical context" supplies the attribute values to be associated with each graphical element. When a new element is created, the attribute values in the graphical context at the time of creation apply to the new graphical element.

The programming language itself therefore includes the following data types:
1. Text objects, which define the font, size, placement and any other desired characteristics of each character, but not the color, opacity, filling or stroking parameters of the text.
2. Path objects, which define the outline of a particular objects shape, but not its color, opacity, filling or stroking parameters.
3. Graphical elements which represent pixel data, an "all" graphical element, the compositing of a number of other graphical elements together by some compositing operator to yield a graphical element, or a Text object or a Path object which has been rendered into a corresponding pixel form.

Image compositing provides a set of binary operators that take images as operands and produce an image as a result. An image is defined to have both color and α or opacity channel information at every pixel, although in some situations the color information of a graphical element is not used. To be able to combine or composite graphical elements of all types, all graphical elements including text, path and "all" graphical elements are treated as if they are scan converted into pixel images before they are composited together. Additionally, the graphical elements, when forming operands, are treated as being notionally infinite in extent. Any pixel outside the boundary of a graphical element is treated as being fully transparent. This extension of each graphical element is implemented to allow a result to be defined when a pixel is within one operand's normal extent but not the other operand. Additionally, some special operations always require the color to be defined, so fully transparent pixels take up a color as represented by the zero components in the rendering color space.

The rendering language of the preferred embodiment can be "executed" in a number of different ways, similar to that of a normal computer language. Computer languages are normally "executed" by a corresponding computer through means of "interpretation" or "compilation", both of which are known to those skilled in the specialized art of computer language compiler writing.

Both interpreters and compilers normally construct a parse or expression tree for the language description which is constructed from a grammar, most likely being context free, that defines the language. For a further explanation of interpreters and compilers, reference is made to a standard text such as "Compilers Principles, Techniques, and Tools" by Aho, Sethi and Ullman, 1986, available from Addison-Wesley Publishing Company, Reading, Mass.

The execution of the programs of the programming language of the preferred embodiment, for speed, size and ease of implementation, is carried out by an interpreter.

For each statement in the programming language, the interpreter parses the statement and converts the statement to an executable form. This executable form is then executed. During execution of this executable form operations which apply to graphical elements will be executed. A number of different techniques can be used to perform these, including immediate execution and deferred execution.

Immediate Execution

For each operation applied to graphical elements, raster storage is created sufficient to hold the resultant pixel image, and the operation is used to combine its operands to produce the pixel data of the output raster image area. This raster image area then becomes the graphical element which is the result of the operation. When a rendering, operation is executed the raster pixels of the desired graphical element are transferred to the output device.

This technique has the disadvantage that large amounts of storage may be required if many intermediate graphical elements are used during the course of the execution of a program. It is also has the further disadvantage that few subsequent optimisations are possible because no information about the subsequent use of a graphical element is available when it is computed or created.

An example of the operation of the interpreter in accordance with the immediate execution model will now be described with reference to FIGS. 5 to 14. Consider the following example series of instructions:

TABLE 2

| | |
|---|---|
| A = text("a"); | (1) |
| A: = text("b"); | (2) |
| A: = text("c"); | (3) |
| B = circle( ) | (4) |
| A = A over B; | (5) |

In the programming language of the preferred embodiment, the expression "A=B" assigns the value of B to the variable A. The expression "A:=B" is a shorthand form of expression of "A=A rover B", where "A rover B" produces the same result as "B over A".

Figure 5:
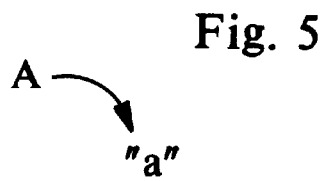
FIGS. 5 to 9 illustrate the construction of an expression tree for a first series of statements.

The function "text" creates a text object, which as mentioned previously, in the preferred embodiment, has no color or opacity information and has only character, font, size and position information. However, the statement A:=text("b") is equivalent to "A=A rover text("b")". When applying the operator "rover" to a text operand, the text operand is first converted to a graphical element. This is accomplished by notionally rendering the text to determine its attributes. Upon execution of the function call "text" the current point is moved by the resultant width of the rendered text string of the graphical element. FIG. 5 shows the corresponding expression tree after completion of the first instruction.

Figure 10:
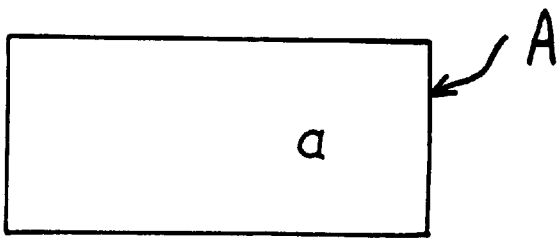
FIGS. 10 to 14 illustrate the compositing process of the first series of statements.

The first instruction, Instruction 1, of Table 2 is equivalent to assigning the graphical element corresponding to the character 'a' to the variable A. The result of this assignment is illustrated in FIG. 10.

Figure 6:
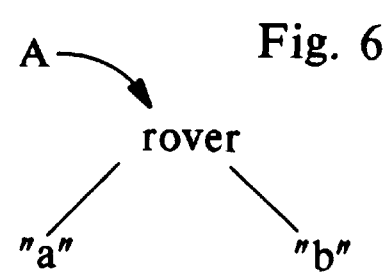
Figure 11:
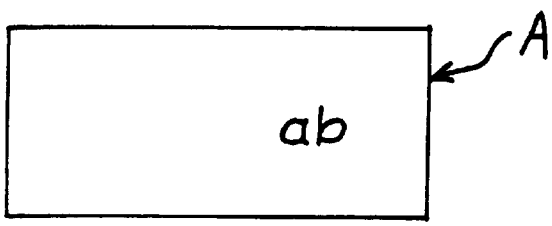
Figure 12:
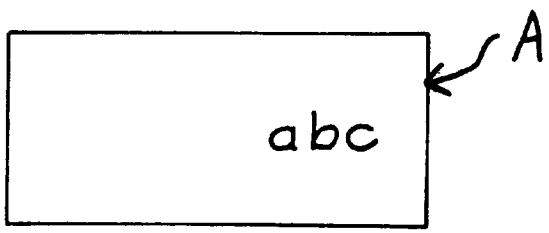

The second instruction, Instruction 2, executed by the interpreter involves rendering the graphical element corresponding to the character 'b' next to the character 'a'. The resulting expression tree, after execution of this statement is as indicated in FIG. 6 and the state of the variable A is as indicated in FIG. 11.

Figure 7:
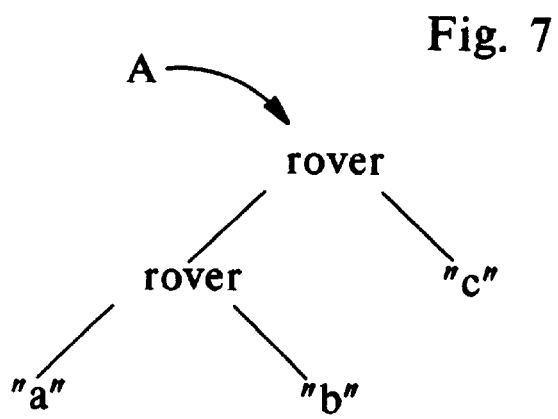

Instruction 3 above involves the rendering of the graphical element corresponding to the character 'c' next to those characters previously rendered. The corresponding expression tree for the series of Instructions (1) to (3) is as depicted in FIG. 7 and the state of the variable A is as indicated in FIG. 11.

Figure 8:
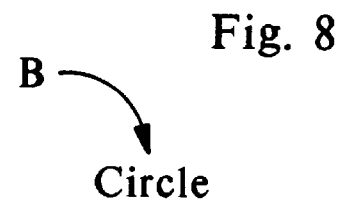
Figure 13:
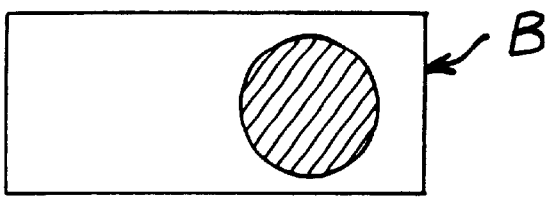

Instruction 4 creates a graphical element comprising a circle and assigns it to the graphical element defined by variable B. The corresponding expression tree for this instruction is as shown in FIG. 8 and state of variable B is as shown in FIG. 13.

Figure 9:
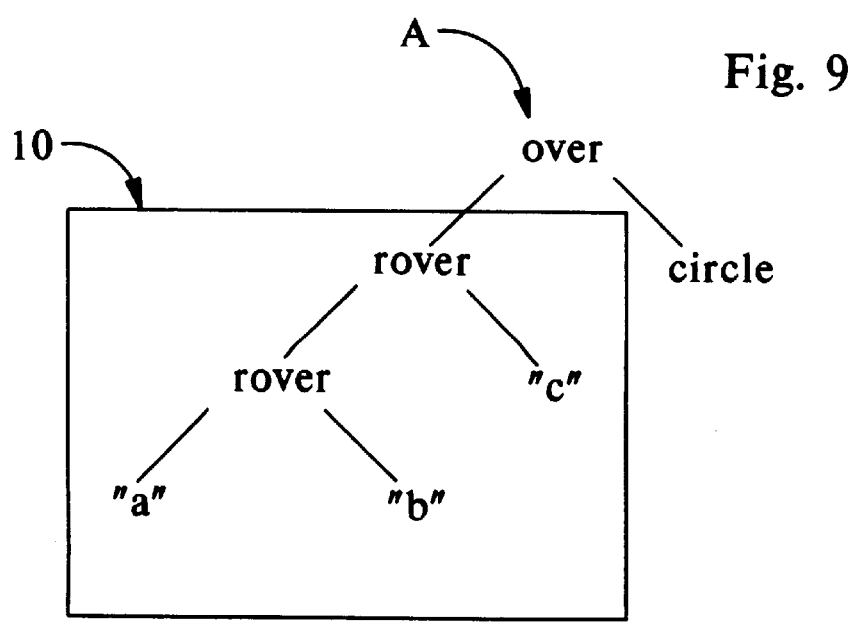
Figure 14:
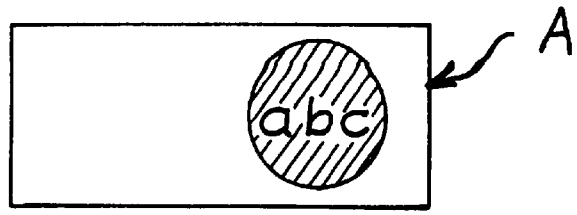

Instruction 5 involves the compositing of the graphical element A over that defined by the graphical element B. FIG. 9 illustrates the resulting expression tree for the graphical element A after execution of Instruction 5. The portion 10 represents the expression tree of FIG. 7 which was the previous expression tree for A, which appears on the right hand side of Instruction 5. FIG. 14 shows the corresponding state of variable A when the immediate execution method is utilized.

Deferred Execution

A second approach to the execution of the compiler is the deferred execution model. In this model, for each operation applied to the graphical elements in the form of program statements, an expression tree node is created representing the operation. The expression tree node created records the operation or operator, and the children of the expression tree node are the operands of the operation. The expression tree node then becomes the graphical element which is the result of the operation. As execution of one or more statements are performed, expression trees produced by previous operations will, from time to time, be further combined with operations to produce more complex expression trees in the same manner as that shown in FIGS. 5 to 9.

Subsequently, when a rendering operation is executed the desired expression tree is recursively traversed and the desired operations carried out to produce the desired image which is transferred to the output device.

This technique has the advantage that rendering operations can be deferred until information is known about the subsequent use of the graphical element so produced. Therefore, memory to store the raster pixels of graphical elements need not be allocated until program execution has finished and optimisations may be performed which take into account the subsequent use of graphical elements.

Two approaches, can be adapted for implementation of the interpreter:

1. A "postfix" or "stack based" approach where graphical element are pushed onto a compositing stack as operands and operators used to act on elements on the stack. Thus, a binary operator can remove the top two stack entries, compositing them and placing the composited result back on the stack. Upon completion of all the statements in the inputted page description, the top of the stack can then be rendered to the output device.

2. An "infix" or "expression based" approach where primitive graphical elements may be either operated on directly or stored in variables. An operator may combine primitive graphic elements, or graphical elements previously stored in variables, or sub expressions, thereby producing a new graphical element which may be stored in a variable or further combined by further operations. A graphical element assigned to a predefined variable, for example "page" can then be rendered to an output device.

The difference between the above two approaches is analogous to the differences in the respective power of a pushdown automaton and a Turing machine.

In the preferred implementation of the interpreter, the second Deferred Execution model is utilized and:

1. Graphical operations are deferred and produce expression trees.
2. An "infix" approach is used for execution of expression trees.
3. All objects with path outlines, characters and images are first notionally converted to fundamental graphical elements which consist of a pixel image of infinite extent. Compositing is then performed by using the operators as defined in Table 1 which includes both binary and unary operators.

Once the expression tree for an image has been created, the image is then ready to be "rendered" to the relevant output device. By utilising a predefined variable such as "page" to represent the graphical element of the output device, the output image can be rendered by rendering the expression tree corresponding to this variable. Assuming that the output device is a device that accepts an output image scan line by scan line, a number of different rendering techniques are possible, including:

1. For each scan line, the expression tree for the output variable is traversed and rendering of each graphical element and compositing operators is performed as relevant to that scan line.
2. Recognising that a binary tree traversal on every scan line is an expensive process in terms of computer time, a linear render list can be first generated from the expression tree. Subsequently, for each scan line, each graphical element is rendered as required and each compositing operation is performed as relevant to that scan line. This form of execution will require a stack to hold intermediate results that correspond to evaluated sub portions of the expression tree.

3. Recognising that it is inefficient to scan all the linear render list for every scan line, a sort of the linear render list can be undertaken, with the list being sorted by the starting scan line of a particular graphical element. When rendering each scan line, an active list can be maintained containing all those graphical elements of the linear render list that effect a currently to be rendered scan line. At the start of each scan line, instructions which begin on that scan line are merged into the active list, and instructions that are no longer relevant are taken out of the active list. This analogous to the techniques of maintaining an active list of display list instructions, which is known in the art.

Once the concept of the third of the above approaches has been conceived, in order to assist the comprehensions of the concept, the interpretation of the page description programming language statements can be likened to the operations carried out by a compiler. The initial expression tree can be likened to a compiler's parse tree, the creation of the render list can be likened to the code generation phase of a compiler, the linear render list created from the parse tree can be likened to assembly instructions or intermediate code utilized in some compilers, and the rendering of the linear render list can be likened to the execution of assembly language instructions by a computer.

The expression tree for a particular set of page description language statements is constructed by the interpreter by executing the statements contained in the page description, including any "while" loops, conditional statements and other normal constructs provided in modern programming languages such as C, Pascal, Algol etc and which are assumed to form part of the programming language. As any expression tree stored in a particular variable can be reused within the page description or within the page description of subsequent pages within a page description language program, it is highly desirable that any expression tree is left in unmodified form from an external or user point of view. However, once the interpreter has completed the construction of the expression tree, compiler style optimisations that might rearrange the structure of the tree are possible. Therefore, to allow these optimisations as part of the rendering process, two sets of pointers are used within the tree and are called the user pointers and the working pointers. When the interpreter is initially constructing the expression tree from the page layout program description, the user pointers are utilized. When the expression tree describing the page layout is subsequently processed for rendering, the working pointers can be used, leaving the user set of pointers intact.

Once the expression tree construction has been completed, the render list generation process can be initiated. This rendering process is initiated by the carrying out of a number of optimisation steps on the expression tree. These steps will be described herein below after the rendering list generation process has been described.

The render list generation process is analogous to the generation of assembly code or of an intermediate code step as carried out by normal compilers. Elements of the render list may be thought of as instructions to composite a graphical element or to perform some other action.

There are two approaches to the render list generation, one of which is better suited to a hardware assisted rendering apparatus with the other one being suited to a "software-only" implementation. Both approaches require the use of a rendering stack for saving the current results of compositing operations for future compositing. The software-oriented approach works with the rendering stack with instructions either pushing a graphic element on the stack or performing an operation on the operands on the stack. The hardware assisted approach assumes the use of an "accumulator". Instructions either load a graphical-element or composite a graphical element into the accumulator, push the contents of the accumulator onto the rendering stack or composite a popped element from the stack onto the accumulator.

Of course, if a directed acyclic graph is permitted, the rendering stack itself will be insufficient and additional temporary storage space will be required for storing common sub expressions.

For the hardware-assisted "accumulator" approach, the "instruction set" can be implemented, as shown in Table 3:

TABLE 3

| clear | acc ← zero |
|---|---|
| load A | acc ← A |
| over A | acc ← A over acc |
| rover A | acc ← acc over A |
| in A | acc ← A in acc |
| rin A | acc ← acc in A |
| atop A | acc ← A atop acc |
| ratop A | acc ← acc atop A |
| xor A | acc ← A xor acc |
| plusW A | acc ← A plusW acc |
| plusC A | acc ← A plusC acc |
| out A | acc ← A out acc |
| rout A | acc ← acc out A |
| cmap M | acc ← M(acc) |
| push | Push copy of accumulator onto rendering stack. |
| clip A, n | A is used also as a clip path n. |
| pushclip n | Push clip path n onto clipping stack. |
| popclip | Pop one clip path off clipping stack. |

In Table 3 the word "acc" stands for the accumulator, and M is a desired color transformation function.

The variable A can be any predefined graphical element, or it can be the operand "pop" which means pop the graphical element currently on the top of the stack and use it as the operand to the instruction.

All the above instructions are given a bounding box in which they operate.

The correspondence between an accumulation base approach designed for hardware, and a stacked based approach designed for software implementation is as follows:

1. Instructions "clear" and "load" will follow one another unless the "clear" instruction is optimized out. They correspond to pushing an operand onto the stack surrounded by a region of zero opacity. The instruction "clear" can therefore be sent on its own when there is nothing to subsequently load.
2. The instruction "push" can be skipped.
3. An operand of "pop" to an instruction such as "over" means that the top two elements of the stack should be composited together leaving the resultant composited element on the stack.
4. An operand "A", which is a graphical element, means pushing the graphical element A on the stack, then compositing the two top elements of the stack leaving the result on the top of the stack.

When an expression syntax tree is to be converted to a render list, several passes are made through the expression syntax tree. These passes perform the following tasks:

1. Expand primitives that are not supported by the rendering hardware (or software) into expression.
2. Perform unary optimisations.
3. Determine the bounding box of the leaf nodes and the internal nodes of the expression tree.
4. Perform bounding box minimisations.
5. Detect clipping paths and label clipped nodes.
6. Perform optimisations.
7. Convert the expression tree to a corresponding render instruction set list.
8. Construct a sorted render instruction list.

The above passes will now be set out in more detail under separate headings.

1. Expand primitives that are not supported by the rendering hardward (or software).

Various primitive functions may not possibly be support by the hardware or software implementation. One example could be where two independent pixel streams are required to be combined to form a single operand. For example, if both color and opacity form part of an image but come from two different variables, the hardware may not be able to combine one pixel stream, which provides the color, at the same time as a second pixel stream, which provides the opacity. In these cases, the primitive representing this situation is as follows:

"color=A, opacity=B"

This primitive can be replaced by the expression:

"(color=A, opacity=fully opaque) in (color=zero, opacity=B)"

at this point.

7. Convert the expression tree to a corresponding render instruction set list

The process for converting the expression tree into a corresponding render list (pass 7) can be described by the following pseudo-code:

```
procedure do_node(n)
    if n is a leaf then
        produce instruction "load n.operand"
    else if n is a unary operator then begin
        do_node(n.operand)
        produce instruction "cmap n.map"
    end else begin
        do_node(n.right)
        if n.left is a leaf then
            produce instruction "n.operation n.left.operand"
        else begin
            produce instruction "push n.left.bounding-box"
            produce instruction "clear n.left.bounding-box"
            do_node(n.left)
            produce instruction "reversc(n.operation)pop"
        end
end
```

In the above translation process, the function "reverse (n.operation)" produces the reverse operation to its parameter "n.operation". For example "rover" is produced instead of "over" and "over" is produced instead of "rover". More formally, given an operator "op" the reverse of the operator, denoted "revop" is the operator such that A op B=B revop A.

The above translation process is initiated by passing the root node to a procedure that firstly issues the instruction "clear root.bounding-box" and then performs a call to do_node(root) with the root node as an argument.

As a further implementation optimisation, a "clipping stack" of shapes which will be clipped to can be utilized. The compositing of any graphical element which is not an intermediate result on the rendering stack, is clipped to the intersection of all the clipping shapes on the clipping stack. This increases the efficiency of rendering operations. Therefore, whenever an instruction on a graphical element is generated, for example "load n.operand" or "n.operation n.left-operand", it should be proceeded by any "push clip" and or "pop clip" instructions required to put the clipping stack in a state corresponding to that which the operand needs to be clipped to.

3 & 4. Determine Bounding Boxes and Perform Bounding Box Minimisation

In the above explanation, it has been assumed that each graphical element is of notional infinite extent. Obviously, to composite two graphical elements of infinite extent would require an excessively large, if not infinite amount of time. The technique of using bounding boxes is utilized to significantly reduce the number of pixels involved in each compositing operation. The process of bounding box minimisation is further designed to find the smallest area portion of each graphical element that is needed to make up the final image. Bounding box minimisation extends to finding the smallest area of each internal node of the expression syntax tree to further minimize the number of pixels to be composited. Further, bounding box minimisation detects those leaves or entire subtrees of the expression syntax tree that do not contribute to the final picture. The process of removing components of the picture description represented by the expression tree where the components are completely clipped out is termed "culling". The result of the bounding box minimisation process is to give each node a "bounding box" which the renderer must fill entirely when creating the image corresponding to that node. Conversely, the rendered must never draw outside the bounding box when creating the image, as the bounding box is the only area saved to and restored from the rendering stack.

Figure 15:
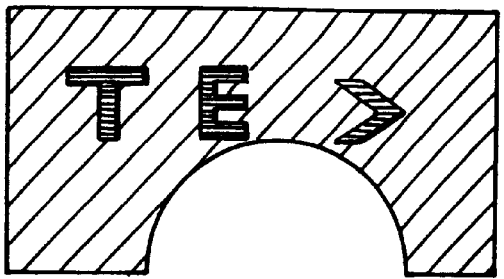
FIG. 15 illustrates a final image resulting from a second series of statements.

Referring now to FIGS. 15 to 18 there will be now explained a simple example of the box minimisation process. FIG. 15 illustrates an image which, for example, can be formed from the following statements:

TABLE 4

| | |
|---|---|
| page = text ("T"); | (6) |
| page: = text ("E"); | (7) |
| page: = text ("X"); | (8) |
| page: = text ("T"); | (9) |
| page = image in page; | (10) |
| B = box out circle; | (11) |
| page = page over B; | (12) |

Figure 16:
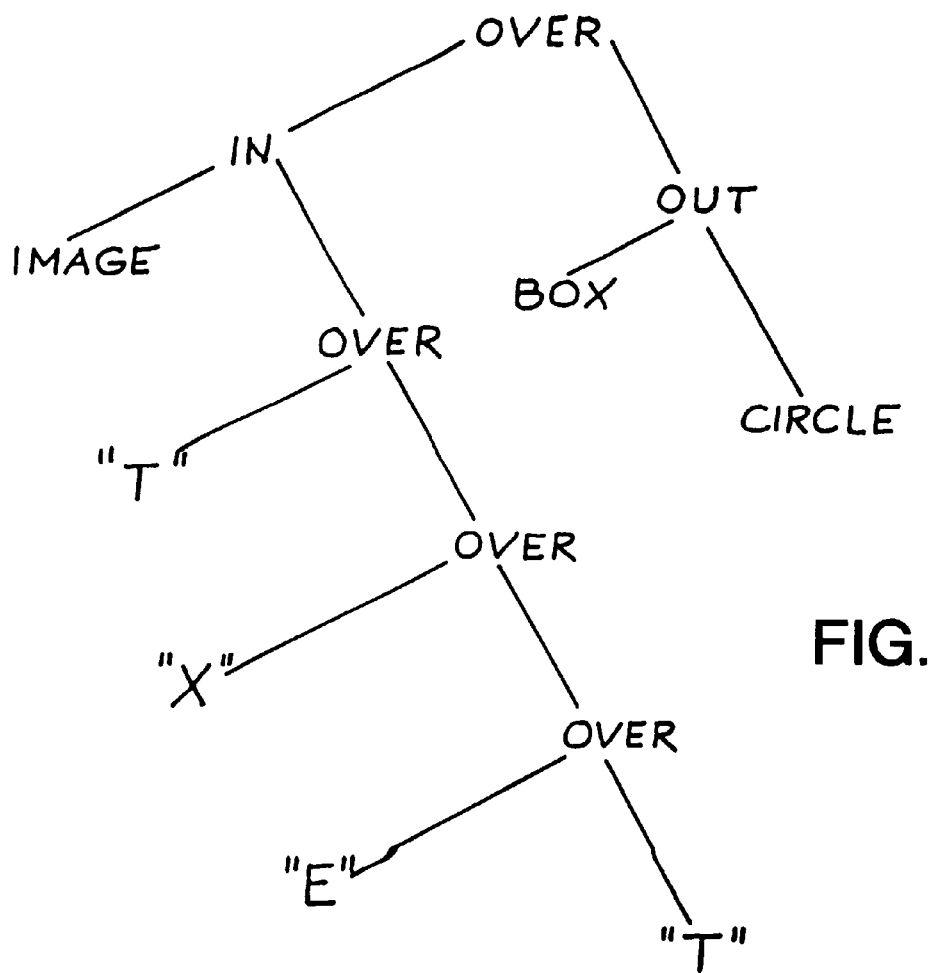
FIG. 16 illustrates the expression tree of the second series of statements.

An expression tree for this series of statements is illustrated in FIG. 16.

The process of bounding box minimisation takes place over two passes. The first pass is a depth-first-post-order traversal of the expression tree. In the first pass, each node's "natural" bounding box is determined. For leaves, this will be the bounding box of the graphical element. For internal nodes, the bounding boxes of the left and right subtree are combined in a manner dependent on the compositing operation of the current node. The combination is as set out in Table 5.

TABLE 5

Combining Bounding Boxes

| Operator | Bounding Box of A operator B |
|---|---|
| over | Bounding Box of Both A & B |
| rover | |
| xor | |
| plusW | |
| plusC | |
| in | Intersection of the Bounding Boxes of A and B |
| rin | |
| out | Bounding Box of A |
| ratop | |
| rout | Bounding Box of B |
| atop | |

Figure 17:
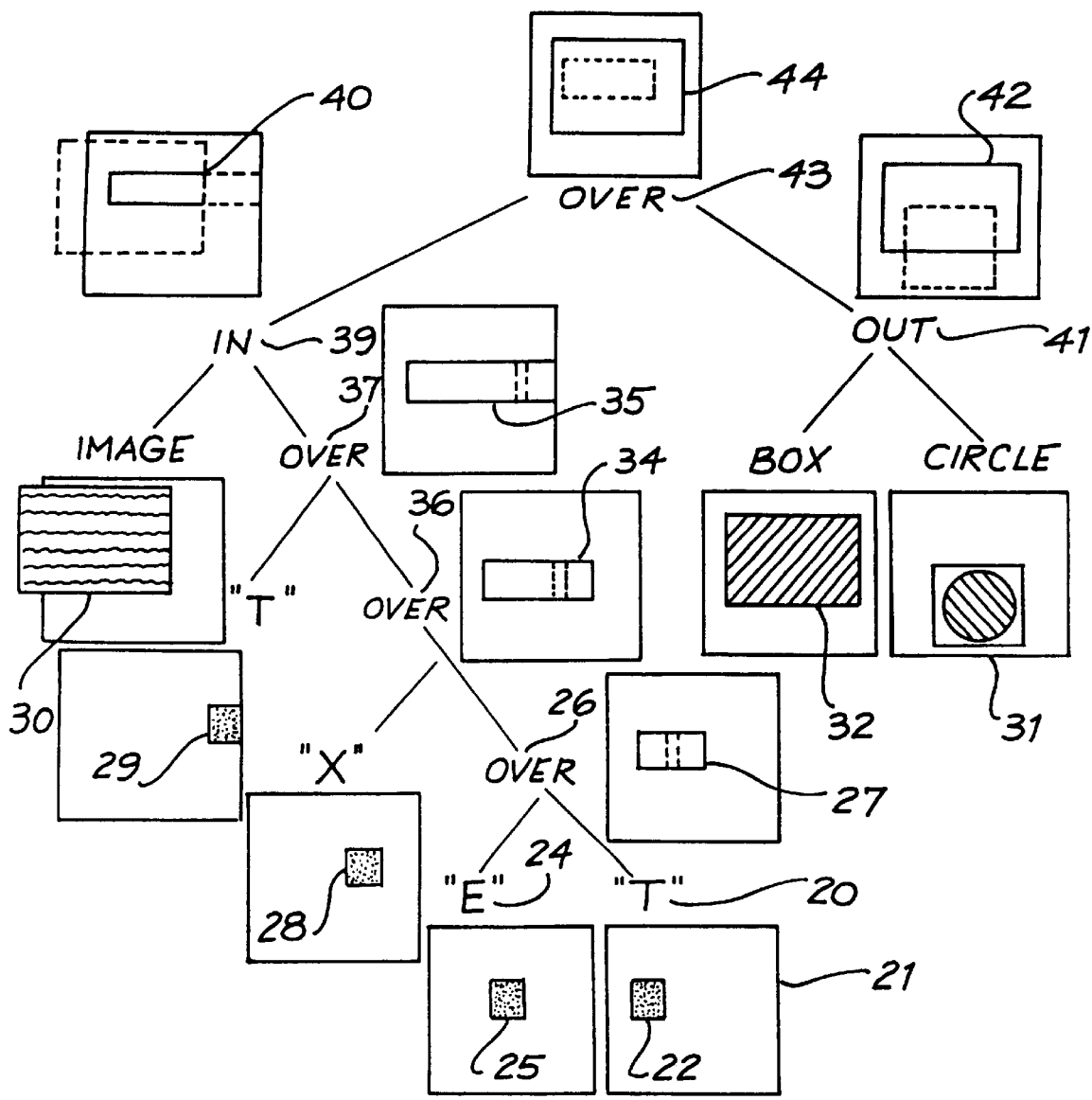
FIG. 17 illustrates the bounding box process carried out on the expression tree.

Referring now to FIG. 17, there is shown an example of this process in relation to the above statements and the expression tree of FIG. 16. The first portion of the image to be rendered in the above statements will be the graphical element corresponding to the letter T 20. This rendering will occur on a page 21 and will only occur in a predefined space or "bounding box" 22 which is the only portion of the scan converted portion of T which is to be laid down on the page 21. The next statement 7 combines the current page image with the graphical element corresponding to the letter E 24. Again, this letter by itself has a predetermined bounding box 25. The two letters E and T are combined using the over operator 26. Therefore, the bounding box 27 stored with the node at over operator 26 will be a combination of the two bounding boxes 22, 25. As the bounding box minimisation routine performs a depth-first post-order traversal of the expression tree, the descendent nodes of a given node will be visited before a current node is visited and therefore the routine will visit all leaf nodes first. For each of the leaf nodes 28–32, the bounding box of the graphical element which is to be rendered is first calculated as shown. Subsequent to the calculation of the bounding boxes of the leaf nodes, the bounding boxes of internal nodes are calculated.

After the calculation of the bounding box 27 of the internal node 26, the bounding boxes 27–28 can be combined 34 again utilising the over operator. Similarly, bounding box 35 is the combination of bounding boxes 29 and 34 utilising the over operator 37.

Figure 4:
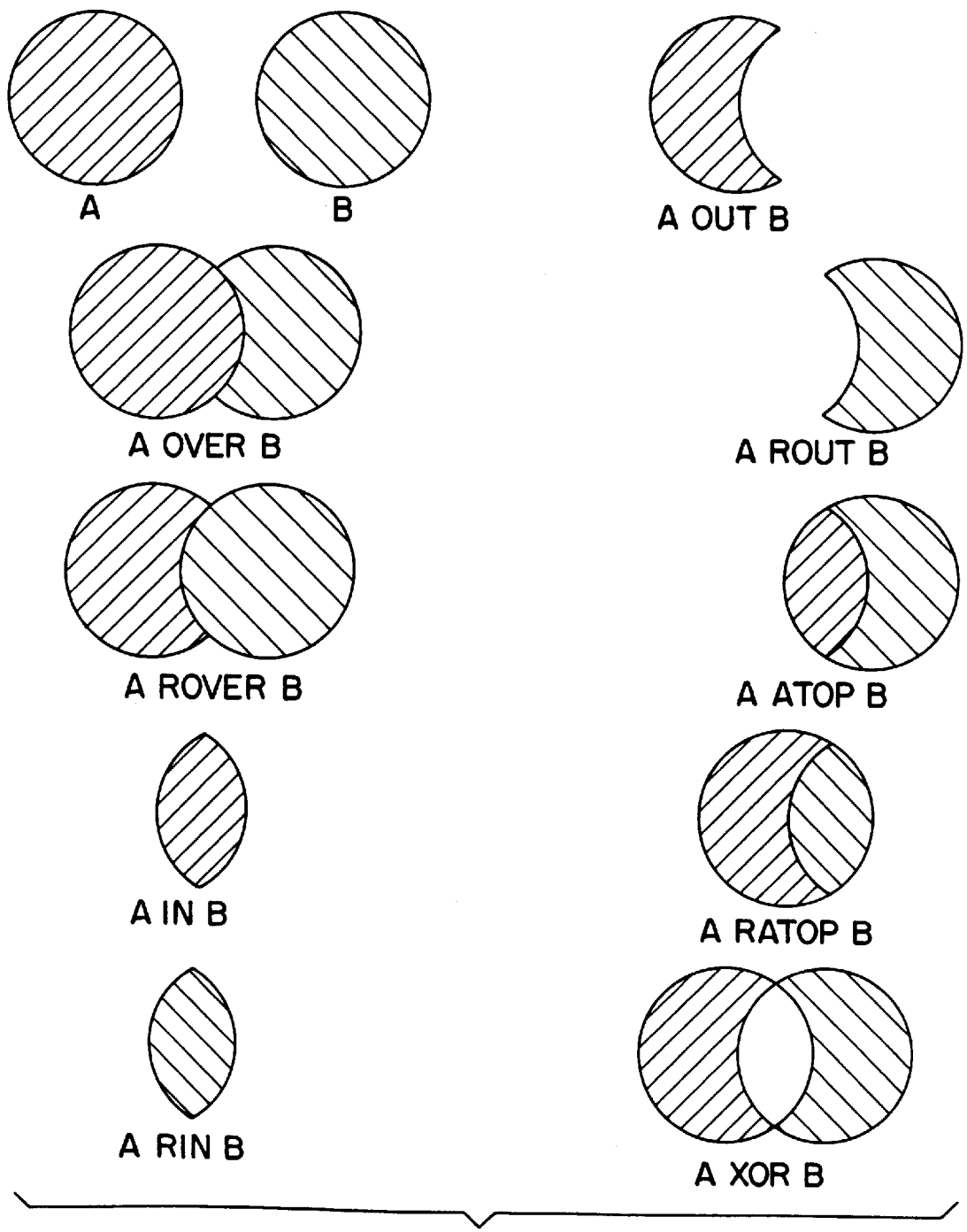
FIG. 4 illustrates various compositing operators and the consequential output as utilized in the preferred embodiment.

As can be seen from FIG. 4, when the two graphical objects A and B are combined utilising the operator "over" the resultant image is the combination of A and B with A taking precedence over B. Therefore, the bounding box will be required to extend over the combined areas of A and B. On the other hand, the combining of A and B using the "in" operator is only defined for those portions of an image where A and B overlap and hence the bounding box for the combined area will be the intersection of the two bounding boxes for A and B.

At node 39, the two bounding boxes 30, 35 are combined using the "in" operator and so the resulting bounding box 40 will be the intersection of the two areas 30 and 35.

At node 41 the two bounding boxes 31, 32 are combined using the out operator. It can be seen from FIG. 4, that the bounding box 42 of the node 41 will be the same as the bounding box 32. Finally, the bounding boxes 40–42 are combined at node 43 utilising the over operator. The corresponding bounding box 44 at node 43 will be the union of the two bounding boxes 40–42. This completes the first pass of bounding box determination. It can be seen that the bounding box process involves determining a combined bounding box of two graphical elements with the size of the combined bounding box being determined by the combined resultant area, after utilising the operators, as shown in FIG. 4.

Figure 18:
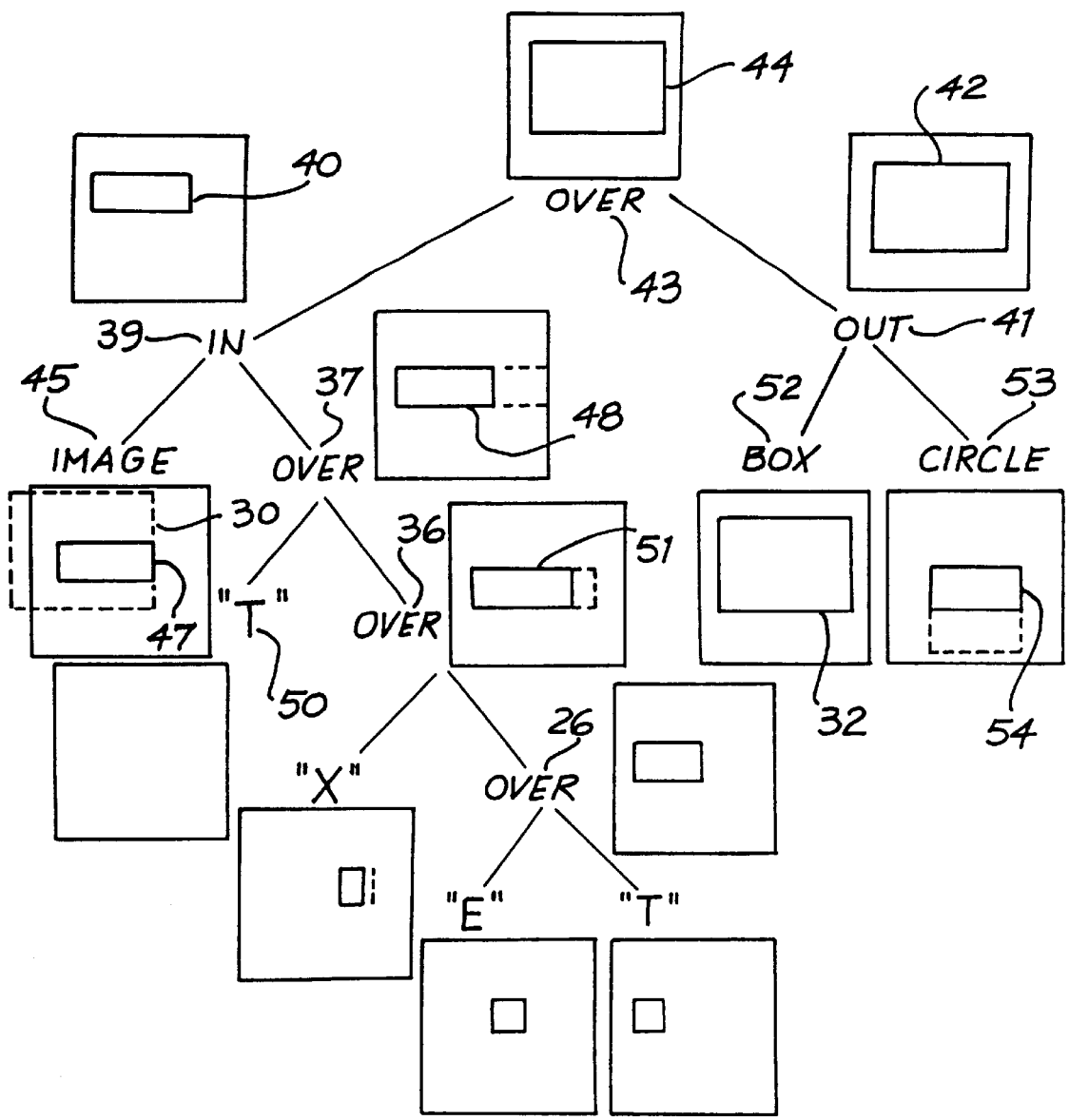
FIG. 18 illustrates a further bounding box minimisation carried out in accordance with the preferred embodiment.

The second stage or pass of bounding box minimisation involves a depth first preorder traversal of the syntax expression tree. In the second pass, the bounding box of each internal node's descendants is intersected by the bounding box of the parent. This process is carried on recursively, so that a child's new bounding box is used to intersect, or minimize, its descendant's bounding boxes. Referring now to FIG. 18, there will now be explained an example of this process. In FIG. 18 there is depicted the same expression syntax tree of FIG. 16 and FIG. 17. A preorder traversal involves visiting the current node first and then its left and right children. Therefore, starting at node 43, the bounding box 44 is intersected with the bounding box 40 at node 39 and no change occurs. The bounding box 44 is also intersected with the bounding box 42 and again no change occurs. The bounding box 40 is then intersected with the bounding box 30 stored at the leaf node 45. The results of this intersection process is bounding box 47.

Therefore, the only portion of the image or graphical element that is required in the final image is that portion defined by bounding box 47 rather than the old bounding box 30. This represents a substantial saving in compositing time as the portion of the image 47 is all that is required to be utilized in compositing operations. Similarly, at node 37 the bounding box 40 is combined with the bounding box 35 (FIG. 17) resulting in a reduced size bounding box 48, again resulting in substantial savings. The bounding box 48 is then intersected with the bounding box 29 (FIG. 17) at node 50. The intersection of the bounding box areas 48, 29 is a null area which means that the node 50 does not form part of the final image. Therefore, this node (and its children, if any) can be deleted from the overall expression syntax tree, with the resulting tree taking a simplified form.

The bounding box 48 is then intersected with the bounding box 34 (FIG. 17) at node 36, producing bounding box 51 which is again of a reduced size.

The bounding box 42 is combined with the bounding box 32 (FIG. 17) at node 52 and no reduction takes place. The bounding box 42 is then intersected with the bounding box 31 (FIG. 17) at node 53 resulting in a reduced size bounding box 54 as compared with the previous bounding box 31.

This process is carried on for each node of the expression syntax tree, hopefully resulting in substantial reductions in those areas that are required to be rendered to form part of the final image. Additionally, where the bounding box is reduced to a null area, whole subtrees can be deleted as these portions of the expression syntax tree will not form part of the final image.

Figure 30:
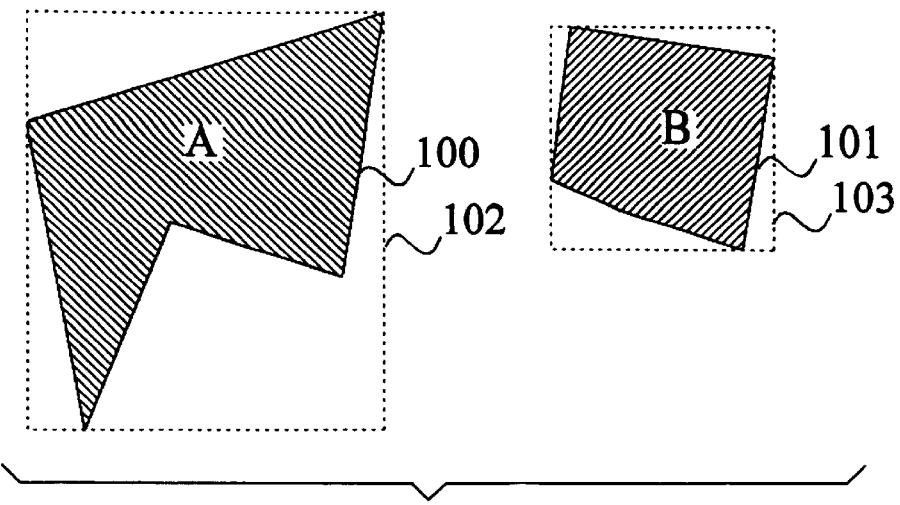
FIG. 30 illustrates two graphical elements and their corresponding bounding boxes.
Figure 31:
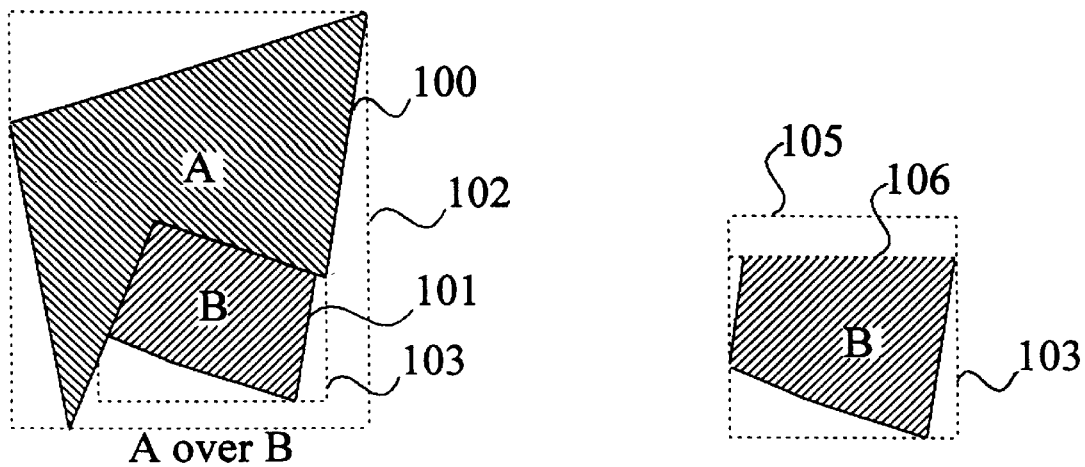
FIG. 31 illustrates the composition of the two graphical elements of FIG. 30.
Figure 32:
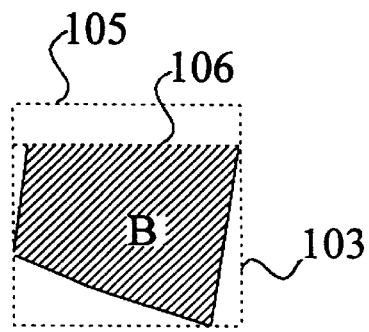
FIG. 32 illustrates the reduced bounding box of one of the graphical elements of FIG. 30.

A further optimisation which can be utilized to further reduce the size of bounding boxes is to detect when one of the operands is under an opaque object. For example, if the operand is an "over" operand and the bounding box of the right hand operand is completely or partially obscured by the bounding box of the left hand opaque operand then the bounding box of the right hand operand can be reduced or eliminated. For example, in FIG. 30 there is shown two objects A 100 and B 101 each having a bounding box 102, 103 respectively. In FIG. 31, there is shown the operation A over B in which the object B is partially obscured by the opaque portions of object A. As a substantial portion of the object B is hidden behind the opaque portion of object A, its corresponding bounding box can be reduced by that part which will be completely covered by the object A. This is shown graphically in FIG. 32 where one side 105 of the bounding box for object B has been reduced from 105 to 106.

One simple form of implementation of this process is to check each leaf node of the expression tree for graphical elements A which are opaque and completely fill their bounding box. In this case the bounding box of B can be reduced or perhaps eliminated depending on whether it is totally obscured by that of A.

5. Detection of clip paths and labelling of clipped nodes

As can be seen from FIG. 4, if an "in" or "out" operation is performed with a fully opaque right operand, the effect is the same as if the left operand was clipped to the boundaries of the right operand. With the "in" operation the effect is only to show those parts of the left operand that lie inside the right operand, and with the "out" operand, the effect is only to show those paths of the left operand that lie outside the right operand. If the boundaries of the right operand are known then these "in" and "out" operations can be performed with clipping rather than compositing.

Figure 19:
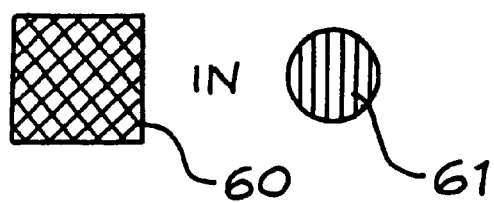
FIG. 19 illustrates two graphical elements to be combined utilising the "in" operator.

A simple example of this process will now be illustrated with reference to FIGS. 19–22. Referring now to FIG. 19, the desired operation to be performed is "square in circle", where "square" represents the graphical element 60, and "circle" represents the graphical element 61.

Figure 20:
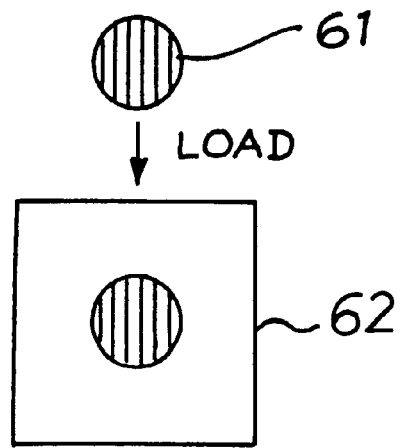
FIGS. 20 and 21 illustrate a first method of combining the graphical elements of FIG. 19.
Figure 21:
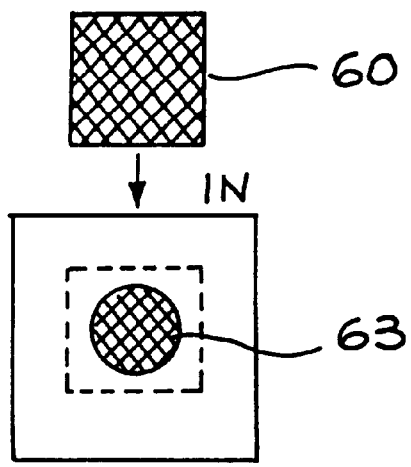

The normal compositing method of implementing this operation is shown in FIG. 20 where the graphical element corresponding to the circle 61 is loaded and composited in the image plane 62. Subsequently, as shown in FIG. 21, the image 62 (FIG. 20) is used as a matte against the square graphical element 60 to produce a circle 63 having color data information from graphical element 60.

Figure 22:
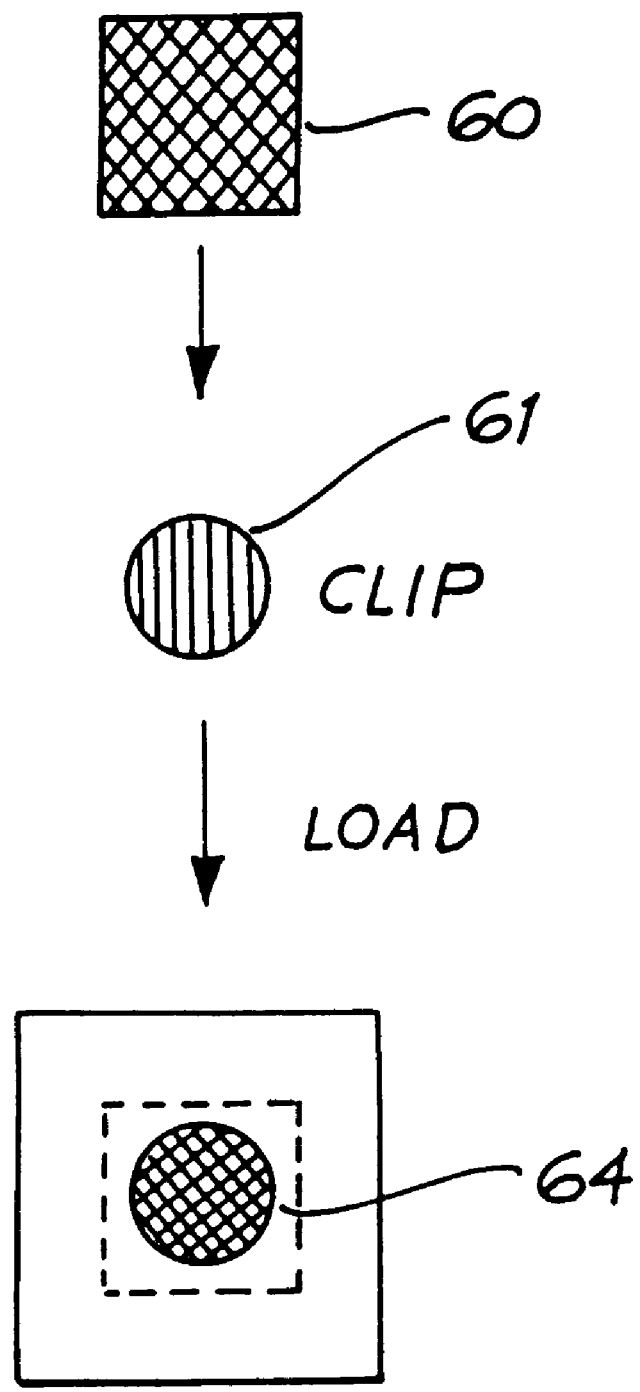
FIG. 22 illustrates a second method of combining the graphical elements of FIG. 19.

In FIG. 22, there is shown a more efficient method of performing the operation of FIG. 19. In this case, the graphical element 60 is immediately clipped against the borders of graphical element 61 to produce the final output 64.

It is not always clear which of compositing or clipping would be the more efficient method to use in both computer time and memory space requirements. However, the following observations should be noted:

1. If a graphic element is utilized as the left operand of an "in" operation, with an opaque graphical element being the right operand, then clipping involves selecting the visible parts of the left hand operand and only compositing them. Compositing, on the other hand, involves saving the current picture, rendering the entire right hand operand graphical element, compositing the entire left hand operand and finally compositing back the saved picture.
2. Large savings can result from clipping images as this can significantly reduce the amount of pixel data which is required to be composited and also reduce the amount of pixel data which is generated before the compositing process.
3. There can be times when the clipping object is quite complex, so that the computing overhead in intersecting the object to be clipped with the clipping object is not worth the gain in reduced compositing. This is likely to be the case when the clipping object consists of small sized text or very complex paths.

In implementing the above clipping optimisation on an arbitrary expression tree, it should be noted that, clipping, ie., "in" or "out" with a fully opaque right operand or conversely "rin" or "rout" with a fully opaque left operand, is distributive over all the binary compositing operators (ie. those operators having two arguments). Therefore, given a fully opaque graphical element c, for all binary compositing operators op the following relationship holds:

$$(a \text{ op } b) \text{ in } c = (a \text{ in } c) \text{ op } (b \text{ in } c) \quad \text{Equation 1}$$

The clipping process is also distributive over all the unary operators, accept when mapping invisible areas to visible areas. This later case is considered to be rare and can be treated as a special case.

Figure 23:
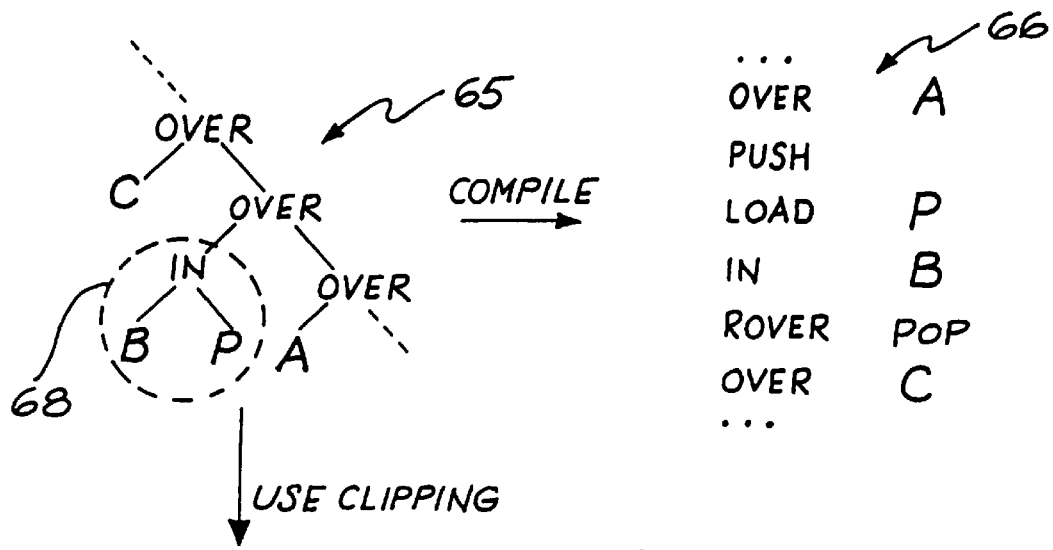
FIG. 23 illustrates a first method of converting an expression tree to corresponding "intermediate level" instructions.

An example of the clipping will now be discussed with reference to FIGS. 23–24. FIG. 23 illustrates an example of the compositing process for a portion of an expression tree 65. This portion of the expression tree 65 is compiled to the corresponding list of machine instructions 66. The list 66 includes the pushing of the current image onto the stack (push), rendering the opaque right hand side operand to the accumulator (load P) compositing the left hand operand using the "in" operator (in B) and compositing back the saved picture (rover pop).

Figure 24:
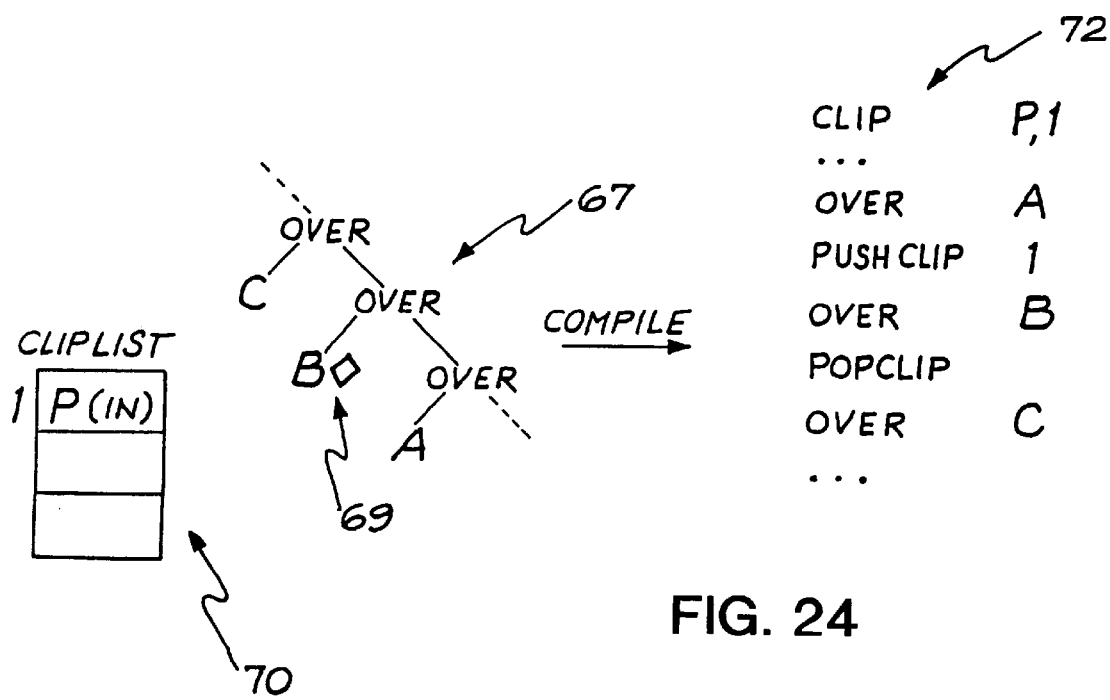
FIG. 24 illustrates a second method of converting an expression tree to corresponding instructions.

FIG. 24 illustrates the process of clipping rather than compositing when the right hand operand is an opaque object. In this situation the expression tree 65 of FIG. 23 is first processed to locate all cases where a graphical element is clipped against an opaque graphical element utilising an "in" or "out" operator eg. 68 (FIG. 23). In each case, this is replaced by a special node indicator 69 and the boundaries of the clipping object are placed in a separate clip list 70. Upon compilation of the new expression tree 67, the code sequence 72 then results. In this code sequence, the clip object corresponding to the boundary of P stored in the clip list 70 as element 1 is placed as a "clip" instruction in the render list (clip P,1), before any other instruction that involves clipping to P. Immediately before any latter instructions, element 1 of the clip list, which corresponds to the boundary of P, is pushed onto the clipping stack (pushclip 1). B is then rendered through the intersection of all boundaries in the clipping stack (over B), the object on top of the clipping stack is then popped, and the instruction sequence continued as in FIG. 23.

The following scheme of implementation is therefore possible:

1. The working set of pointers of the expression tree is searched for paths that can be converted in above manner. When a path or object is found, it is removed from the set of working tree pointers and put into an array called the clip list. An index to this array (a clip ID) is recorded in the current node in addition to recording whether the optimisation was a result of an "in" or "out" operation.
2. Upon recursing down the expression tree, it is necessary to keep track of the clip ID's of any graphical element that has been converted to a clip object in the clip list, so that leaf nodes of subsequent portions of the expression tree requiring clipping by the clip ID can be tagged. Since any initially clipped subtree can contain further portions suitable for conversion to clipping outlines, it is necessary to maintain a stack of clip IDs. Whenever we find a graphical element that is to be turned into a clipping outline, its clip ID can be pushed onto the stack, the clipped subtree can then be traversed, and, on return, the clip ID on top of the stack can be popped. Whenever a leaf node is encountered in the traversal, it is tagged with all the clip IDs currently on the stack at that time.
3. When the render list is generated, the "clip" instructions required for the generation of each graphical element that has been converted to a clip and stored in the clip list are generated before that element is used (such as at the beginning of the program).
4. The render time "clip stack" can be manipulated by "push clip" and "pop clip" instructions that surround the various compositing instructions. When the graphical object is to be composited, it is clipped to all the clip objects in the clip stack at that time. Thus, on generation of the render list of instructions, it is necessary to keep a track of the state that the clip stack will have when a graphical element is being composited. If the clip stack state is not as in the required state. For unary operators that convert invisible pixels to visible pixels, additional clipping is required upon their use. That is, it is necessary to apply the operator only to visible portions of a graphical element and leave the state of clipped areas said to be invisible.

Of course, in addition to the above clipping process, graphical elements can require a further clipping due to their minimized bounding boxes.

2. Perform unary optimisations

The instructions set provides an instruction (cmap M) for altering the colors of certain graphical elements in accordance with the mapping defined by M.

Sometimes, color map operations which can be available in the page description language can be performed at the expression tree stage rather than during rendering. For example, if it is required to change the color of the graphical element by use of a color map, it can be possible to change the color of the element before the rendering process takes place and thus allow the removal of the color mapping operation from the expression tree. However, sometimes the color of a graphical element can interact with its opacity or α channel values in a color map operation. The color map operation must be carefully analysed to determine whether or not it can be applied at the expression tree stage.

Figure 33:
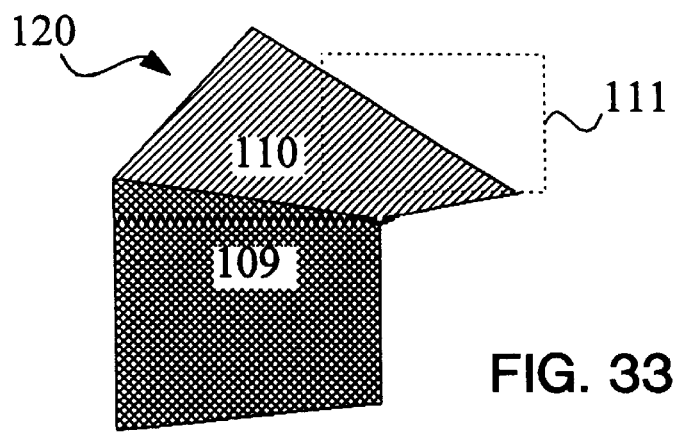
FIG. 33 illustrates a color optimisation performed by the preferred embodiment.

Additionally, any graphical element can be simplified when their color is taken into account. For example, with reference to FIG. 33 the graphical object indicated generally 108 may include a region 109 having a complex form of color blend and a second region 110 having a constant color blend. The bounding box optimisation process, as outlined above may have produced an optimized bounding box 111 having a boundary which does not encompass any of the region 109. Thus, the color of the object 108 can be changed to be of a constant color equivalent to that of region 110 when evaluating the corresponding expression tree.

6. Optimisation

Different forms of optimisation are possible on the expression tree. Firstly, as previously mentioned, those portions of the expression tree whose bounding boxes have been minimized to be null, can be deleted from the expression tree.

The algebraic properties of compositing operators can be utilized to rearrange the expression tree so that more efficient operations are substituted for more expensive operations wherever possible. These algebraic properties are identities involving the associativity, commutativity and reversal of the various operators. The optimisation process involves traversing the tree in a preorder fashion and, at each node, the optimizer tests whether each of a set of rules derived from the algebraic properties match the current node. Upon determining which rules can apply, an estimation is made of the likely improvement to the cost of rendering the expression tree by modifying it in accordance with the algebraic property. The costs of a given node can be estimated as a linear combination of the height (h) and area (h×w) of the left subtree's bounding box. As will be come clearer hereinafter, the associativity properties can be used to right skew the expression tree so as to significantly reduce the stack depth required during the rendering process. Swapping a node's subtrees by applying a commutative or reverse operator should then only be applied if the cost in terms of the area which must be composited will be decreased. This can result in an increased stack depth but corresponding decrease in execution time.

Each node of the expression syntax tree stores the number of scan lines h and the area hw of the bounding box in pixels. Therefore, to determine the costs of a common operation such as "A over B" the following factors need to be estimated:

$C_{1over}$ is the cost per scanline to perform an "over" on a simple graphical element.

$C_{2over}$ is the cost per pixel to perform an "over" on a simple graphical element.

$C_{3over}$ is the cost per scanline to perform an "over" on a complex graphical element made up of the combination of many simple graphical elements.

$C_{4over}$ is the cost per scanline to perform an "over" on a complex graphical element.

h is the number of scanlines with the boundary of A.

hw is the number of pixels within the bounds of A.

The overall cost is therefore as follows:

if the graphical element is simple then $$\text{cost} = C_{1over}h + C_{2over}hw$$

else graphical element is complex $$\text{cost} = C_{3over}h + C_{4over}hw \quad \quad \text{Equation 2}$$

Figure 25:
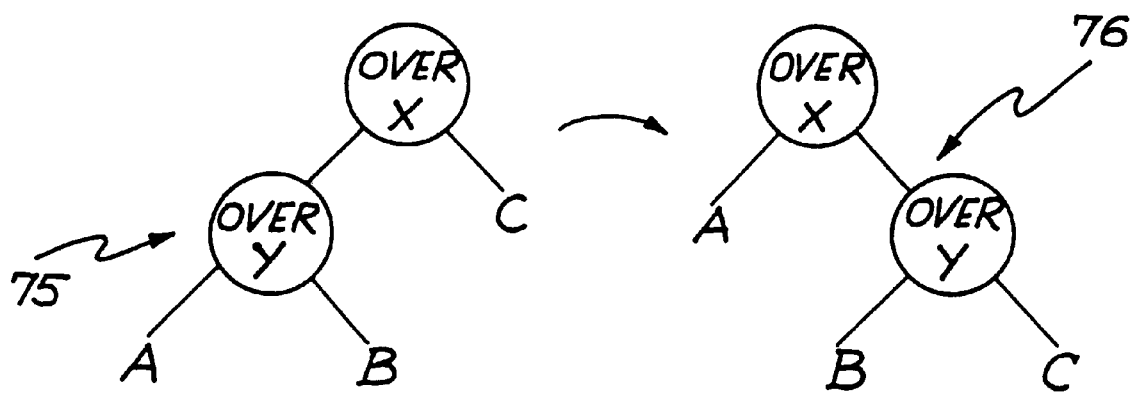
FIG. 25 illustrates a first optimisation to be carried out on an expression tree.

The associativity property can be used to skew the expression tree. A skewed expression tree will most often result in a corresponding set of render instructions which take less time and memory to execute. Referring now to FIG. 25 there is shown an example of right skewing a portion 75 of an expression tree to form a corresponding right skewed portion 76. A formula for calculating whether the operation depicted in FIG. 25 should be carried out is as follows:

$$f_{over}(A) + f_{over}(Y) > f_{over}(A) + f_{over}(B) \leftrightarrow f_{over}(Y) > f_{over}(B) \quad \text{Equation 3}$$

where $f_{over}$ (Z) is the cost of performing an "over" compositing of the graphical element Z.

As B's bounding box will always be equal to or smaller than Y in portion 75, and, most often, compositing a complex graphical element will be more difficult than compositing a simple graphical element, this associativity operation will almost always provide a faster or equally fast syntax expression tree to render. The tree can be changed simply by changing the pointers from 75 to 76.

Figure 26:
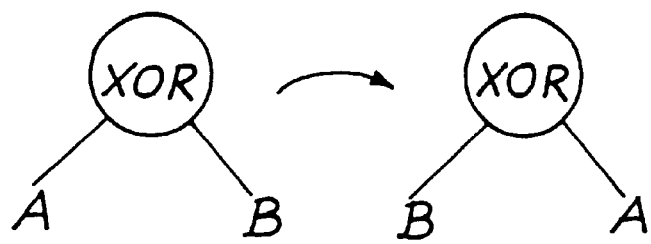
FIG. 26 illustrates a second optimisation to be carried out on an expression tree.

In relation to those operators that are commutative, it may be advantageous to commute some of the operands of a commutative operator. For example in FIG. 26, the operands of the "xor" operator are pictorially commuted. The decision to commute will depend on the cost of the left tree and the cost of the right tree. Therefore if $$f_{xor}(A) > f_{xor}(B) \quad \quad \text{Equation 4}$$

the operands will be swapped. This will most often be dependent on the storage size required to render two areas A and B and can be simply implemented by again altering the pointers as shown in FIG. 26.

Figure 27:
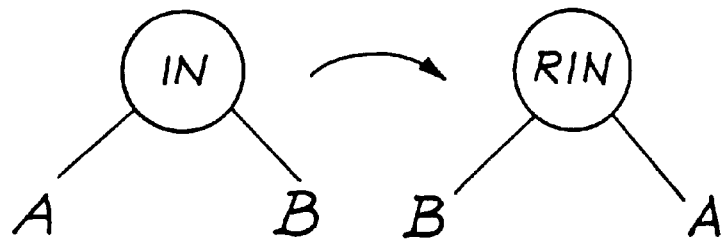
FIG. 27 illustrates a third optimisation which can be carried out on an expression tree.

Sometimes, it can be useful to swap some operators to their inverses. For example, FIG. 27 illustrates the process of inverting the "in" operator to its inverse "rin" with the corresponding swapping of pointers. Again, calculation of the proposed cost of the two methods will determine if a swap should be carried out. A number of other optimisations are possible in accordance with the following series of transformations:

TABLE 6

| | |
|---|---|
| (a over b) over c → | a over (b over c) |
| → | a over (c rover b) |
| → | c rover (a over b) |
| → | c rover (b rover a) |
| (a over b) rover c → | c over (a over b) |
| → | c over (b rover a) |
| → | b rover (c over a) |
| → | b rover (a rover c) |
| (a rover b) over c → | b over (a over c) |
| → | b over (c rover a) |
| → | c rover (b over a) |
| → | c rover (a rover b) |
| (a rover b) rover c → | c over (b over a) |
| → | c over (a rover b) |
| → | a rover (c over b) |
| → | a rover (b rover c) |
| (a in b) in c → | a in (b in c) |
| → | a in (c rin b) |
| → | c rin (a in b) |
| → | c rin (b rin a) |
| (a in b) rin c → | c in (a in b) |
| → | c in (b rin a) |
| → | b rin (c in a) |
| → | b rin (a rin c) |
| (a rin b) in c → | b in (a in c) |
| → | b in (c rin a) |
| → | c rin (b in a) |
| → | c rin (a rin b) |
| (a rin b) rin c → | c in (b in a) |
| → | c in (a rin b) |
| → | a rin (c in b) |
| → | a rin (b rin c) |
| (a plusC b) plusC c → | a plusC (b plusC c) |
| → | a plusC (c plusC b) |
| → | b plusC (a plusC c) |
| → | b plusC (c plusC a) |
| → | c plusC (a plusC b) |
| → | c plusC (b plusC a) |
| (a plusW b) plusW C → | a plusW (b plusW c) |
| → | a plusW (c plusW b) |
| → | b plusW (a plusW c) |
| → | b plusW (c plusW a) |
| → | c plusW (a plusW b) |
| → | c plusW (b plusW a) |
| a xor b → | b xor a |
| a plusC b → | b plusC a |
| a plusW b → | b plusW a |
| a over b → | b rover a |
| a rover b → | b over a |
| a in b → | b rin a |
| a rin b → | b in a |
| a out b → | b rout a |
| a rout b → | b out a |
| a atop b → | b ratop a |
| a ratop b → | b atop a |

Additionally, there are many other transformations which can be applied, especially when the subtree involved is the right operand of an "in" or "out" operator (or equivalently, the left operand of a "rin" or "rout" operator).

All the previous mentioned optimisations and alterations to the expression tree can be carried out on the working set of pointers so that the user's set of pointers remains unaltered and hence the alterations will not be detected should it be necessary to alter the expression tree.

Once the expression tree has been optimized, it can then be utilized to generate the render list instructions, as previously outlined (step 7).

Figure 28:
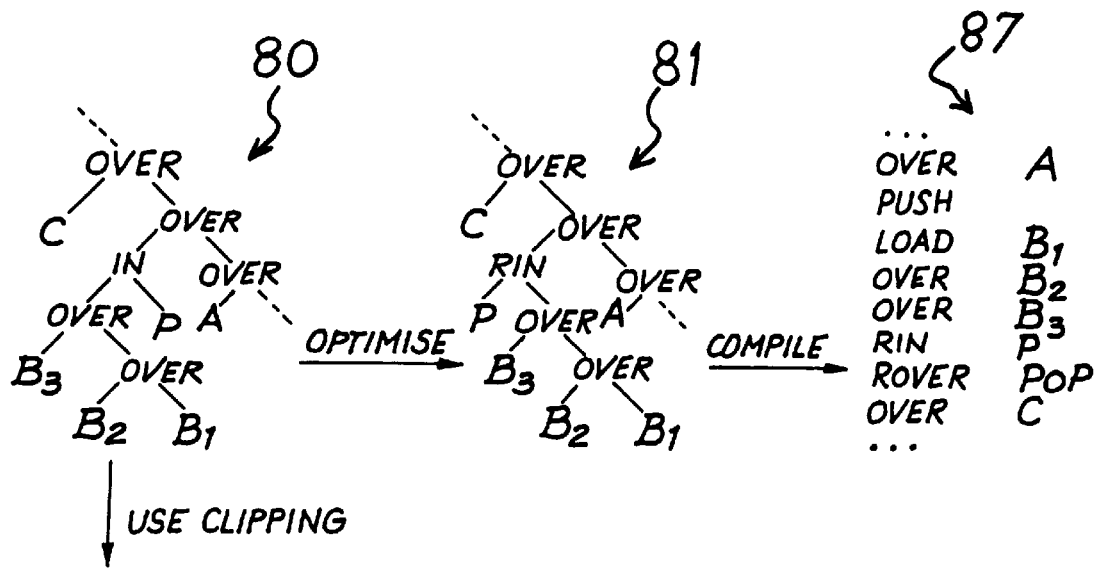
FIG. 28 illustrates a first method of optimisation of a portion of an expression tree.
Figure 29:
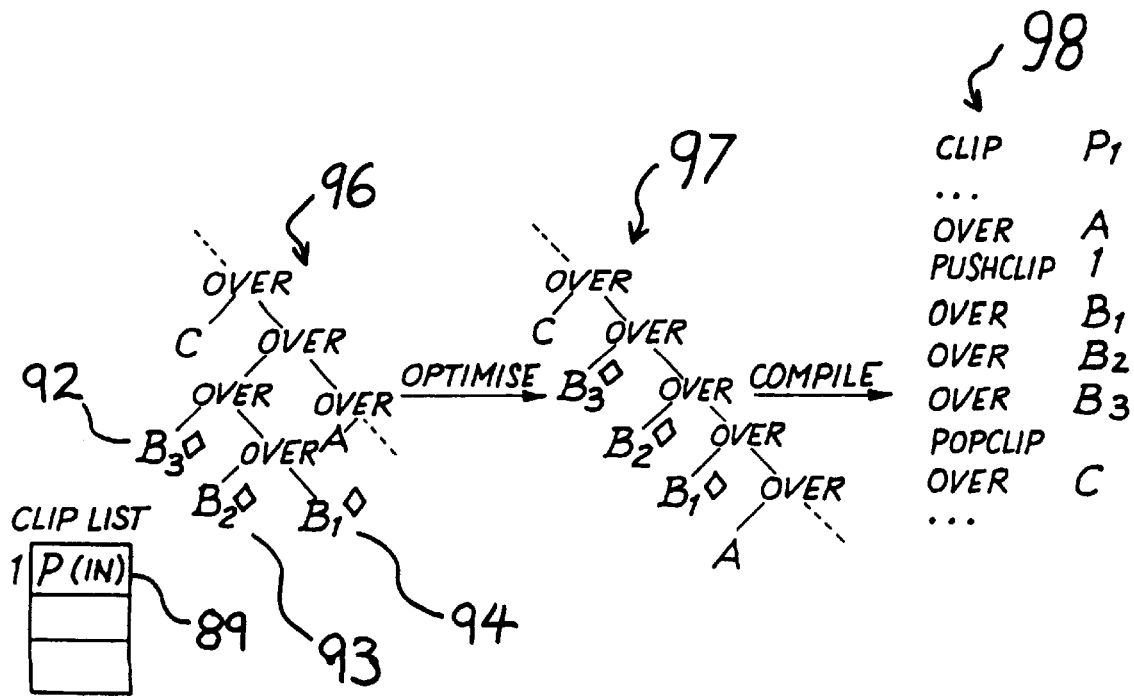
FIG. 29 illustrates a second method of optimisation of a portion of an expression tree.

Turning now to FIGS. 28, 29, a more complex example of manipulation of the expression tree will now be disclosed. An initial portion of the expression tree 80 is to be converted to a series of intermediate code instructions. A first method of conversion is to merely optimize the portion of the expression tree 80 in FIG. 28 to form a corresponding optimized portion of the expression tree 81. The optimisations performed on the tree include the changing of the operand 83 from "in" to "rin" 84. The changing of this operator has a consequential permutation of its operands and occurs as a result of the operand P being substantially smaller than the subtree operand whose root is the "over" operator 86. The optimized expression syntax tree 81 is then converted to intermediate code instructions 87. The rationale behind this optimisation is that tree 80 would require two pushes and pops whereas tree 81 requires only one. The simpler set of instructions resulting from tree 81 are thus likely to be faster to execute and require less memory.

FIG. 29 shows alternative forms of the portion of the expression tree 80 when clipping is utilized. It is assumed that the graphical element P 85 is an opaque object and, as a result, the graphical element produced by the "over" operator 86 will be combined with the opaque graphical element 85 using an "in" operator 83. As outlined with respect to FIGS. 19–22 clipping against the opaque object P 85 can be used instead of the "in" operator. Therefore, the outline of P is stored 89 in a clip list, along with the operator 83 used in conjunction with operand 85.

As the clipping operation is distributive over all other binary compositing operators (see Equation 1) clipping to P85 can be distributed over operators 86, 91 resulting in each of the leaf nodes 92–94 being marked for clipping against the outline 89 stored in the clip list.

The resulting expression tree 96 can then be optimized to form optimized expression tree 97. The optimized expression tree 97 is formed from the expression tree 96 by repeated application of the associative rule for the "over" operator (as set out in table 4) which has the form (A over B) over C=A over (B over C).

The optimized expression tree is then utilized to then generate intermediate instructions 98. By comparing the list of instructions 87 (FIG. 28) with the list of instructions 98 (FIG. 29) it can be seen that the list 87 includes a push instruction for pushing the current contents of the accumulator onto the stack in addition to the loading or compositing of the whole of $B_1$, $B_2$ and $B_3$ before being subjected to the "rin" instruction with P as the operand. The result of this operation is then composited with the top of the stack (by the instruction "rover pop"). In the second series of instructions 98 the clip list is initially loaded with the outline of P, A is then composited on the current accumulator contents followed by the pushing of the outline of P onto the clip stack and the subsequent compositing of $B_1$, $B_2$ and $B_3$ through the outline of P which will be on the top of the clip stack. The top of the clip stack is then popped (instruction "popclip") before C is then composited over the remaining contents of the accumulator. The series of instructions 98 is likely to be substantially more efficient than the series of instructions 87, the speedups being achieved through the use of clipping instead of compositing and the use of the associative operators.

Figure 34:
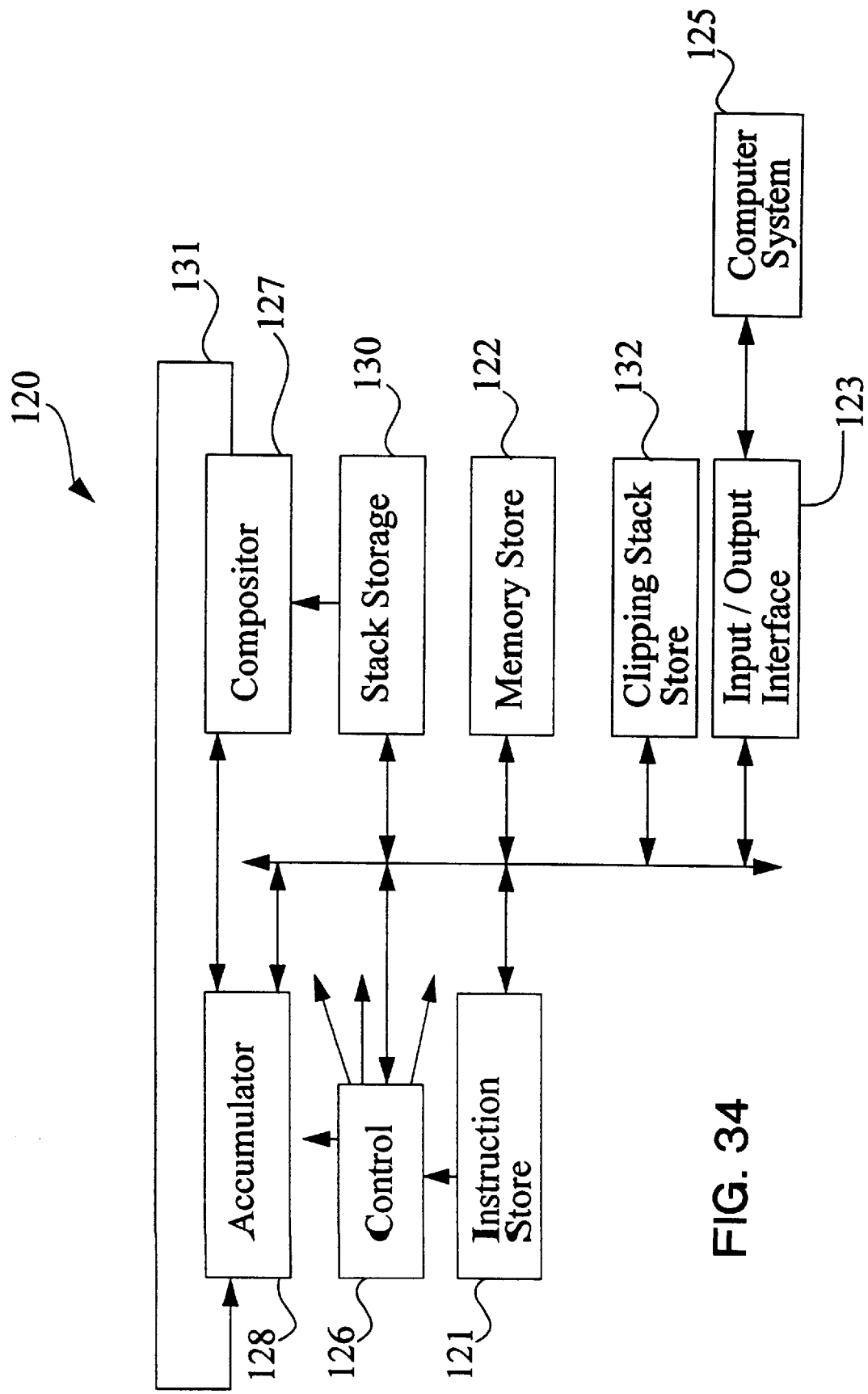
FIG. 34 illustrates a computer architecture for executing the instructions of the preferred embodiment.

As mentioned previously, the instruction sequence produced from the expression syntax tree can be adapted for execution on a software based machine or a hardware based machine. An example hardware based approach will now be disclosed with reference to FIG. 34. Referring now to FIG. 34, there is shown an example hardware architecture 120 adapted to run sequences of instructions, for example, as set out in Table 3. The hardware architecture 120 can be implemented by the adaption of standard computer architecture techniques as set out in standard textbooks as, for example, in chapters 3 to 8 of the text "Computer Architecture—A Quantitative Approach" by John Hennessy and David Patterson, 1990, published by Morgan Kaufmann Publishers Inc.

The hardware architecture 120 is designed to operate under the control of a standard external computer system 125 which interfaces to the hardware architecture 120 by means of input/output interface 123 which can be of a standard type such as PCI or the like.

As noted previously, the instruction sequences are normally sorted by can line order and an active list maintained by the external computer system 125 for a current scan line. In the hardware architecture 120, instruction sequences for a particular currently active scan line are loaded into instruction store 121 from the external computer system 125 via an input/output interface 123 and the graphical elements required by the instruction sequence are loaded into memory store 122 in addition to the clipping list. The control portion 126 is then activated and begins reading instructions from instruction store 121 and executing them by means of a microprogrammed memory stored within control portion 126, again utilising standard techniques.

An accumulator 128 has sufficient storage space for storing the color information and opacity information for a whole scan line. Stack storage space 130 has sufficient space for storing a predetermined maximum number of scan lines which represent the maximum depth which the stack will grow to in any one line.

Each time a "pushclip" instruction is encountered in the instruction sequence by control portion 126 the relevant clipping object stored within clipping list in memory store 122 is intersected with the current contents of the top of a clipping stack 132 and the result stored as a new top element of the clipping stack 132. When a "popclip" instruction is encountered, the current top of the clipping stack 132 is popped.

For each compositing instruction, the control portion 126 controls the operation of a compositor 127 which implements the compositing operations of Table 1 on two pixel color and opacity streams, with the first stream coming from an accumulator 128 and a second stream coming from stack storage space 130 (when required). The control portion 126 determines the boundaries of compositing of the pixel streams from the current top element of the clipping stack 132. The resulting color and opacity output of compositor 127 is fed back 131 to accumulator 128.

Once the instruction sequence has been completed, control portion 126 notifies the computer system 125 which reads the results for the current scan line from accumulator 128 and either outputs or stores the result as desired.

The preferred embodiment as hereinbefore described has been presented in a form to maximize the clarity and understanding of one skilled in the art of computer graphics, algorithms, data structures, computer architecture and compiler writing. Of course, many further optimisations can be possible. For example, the use of recursion in tree traversal can be eliminated using certain known methods such as tail recursion or maintaining back pointers.

Additionally, a broad spectrum of facilities are normally available in standard programming languages, including page description languages. These facilities normally vary from language to language and so the actual details of any particular language have not been assumed. Of course, a person skilled in the above fields is able to readily implement the hereinbefore described embodiment in a page description language.

Figure 35:
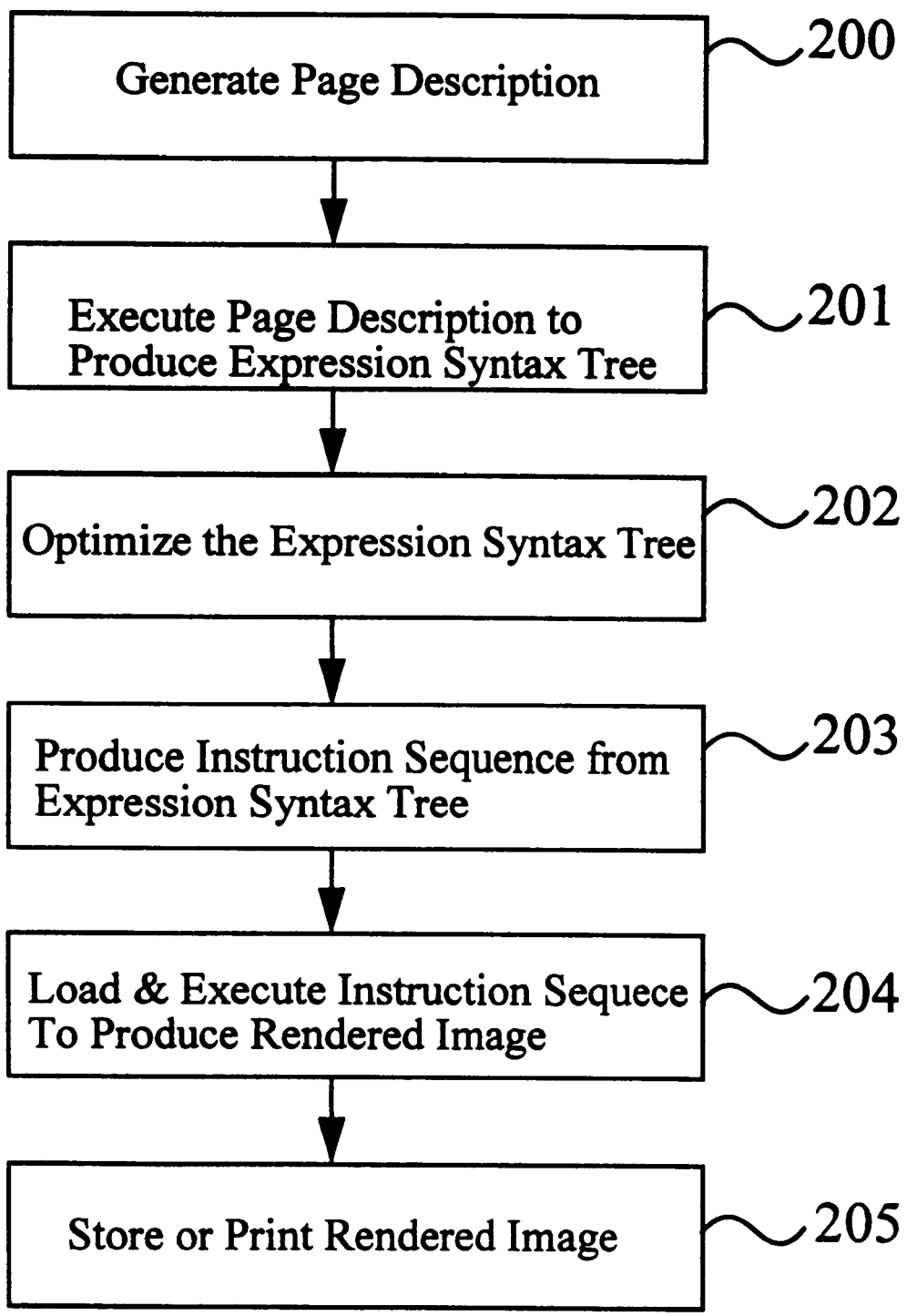
FIG. 35 contains a flow chart that depicts the compilation and execution of instructions of the preferred embodiment.

Referring now to FIG. 35, there will now be explained the overall process of compilation and execution of a series of programming language instructions. Firstly, at step 200, the desired programming language instructions are created. These instructions can be created by hand in accordance with a valid syntax description for the programming language, however they are preferably created utilising a page layout application in the normal manner.

Once a valid list of programming language instructions is obtained, each instructions can be interpreted, as indicated at step 201, by the computer system 125 (FIG. 34) so at to build a corresponding expression tree as hereinbefore described, for example, with respect to FIG. 16. The nodes of the expression tree can include the relevant bounding box information of any graphical element to be utilized at that node. The expression tree created will be dependant on the syntactical constructs of the language and the particular series of instructions executed.

The expression syntax tree can then be optimized at step 202 by the computer system 125 in accordance with the various optimization mentioned previously with reference to performing passes on the expression syntax tree. These optimizations can include the bounding box optimizations described with reference to FIGS. 17 and 18, the clipping optimizations described with respect to FIGS. 22 to 24, and the tree optimizations described, by way of example, with reference to FIGS. 25 to 27.

Next, a series of assembly language instructions can be produced at step 203, by the computer system 125, from the optimized expression syntax tree of step 202. These instructions comprise the render instruction set list for execution by hardware architecture 120.

Once the render instruction set list has been created, it can be transferred at step 204 to the instruction store 121 and any desired graphical elements can be transferred to memory store 122. The instructions can then be executed by hardware architecture 120 to produce a rendered image. After the image has been rendered, it can be read out of memory store 122 by computer system 125 and stored, displayed or printed as desired, as indicated at step 205.

The foregoing describes only one preferred embodiment of the present invention with many different variations. Further variations, obvious to those skilled in the art, can be made without departing from the scope of the present invention.

What is claimed is:

1. A method of rendering an image, the method comprising the steps of:

creating an expression tree representing the image, wherein the expression tree comprises leaf nodes and group nodes comprising graphical elements and operators, respectively;

converting the expression tree to a corresponding list of instructions;

maintaining an active list of the instructions and graphical elements of those instructions and graphical elements that effect a currently scanned scan line; and rendering the image on a scan line basis in accordance with the active list of instructions and graphical elements for the currently scanned scan line, wherein said creating step includes a step of:

optimizing the expression tree by constructing, for each node in the tree, a bounding box of those areas of the graphical elements of the node and its descendent nodes of the expression tree which are active in the production of the image, and wherein said converting step includes a step of:

generating from the optimized expression tree the list of instructions and graphical elements sorted in scanline order.

2. A method of rendering an image as claimed in claim 1, wherein the group nodes of the expression tree comprise operators for combining corresponding descendant nodes of the expression tree.

3. A method of rendering an image as claimed in claim 1, wherein each of the group nodes of the expression tree stores bounding box information indicative of the boundaries of the graphical elements of children of said group node.

4. A method of rendering an image as claimed in claim 1, wherein each of the leaf nodes of the expression tree stores bounding box information indicative of a portion of a leaf node graphical element which appears in the image.

5. A method of rendering an image as claimed in claim 1, wherein the expression tree is a binary tree.

6. A method of rendering an image as claimed in claim 1, wherein the execution of the maintaining and rendering steps is deferred.

7. A method of rendering an image as claimed in claim 6, wherein the sorting is also deferred.

8. A method of rendering an image as claimed in claim 1, wherein said converting step comprises, for the expression tree, assigning a root node of the expression tree to be a current node, and the performance of at least one of the following steps (a) to (c):
   (a) if the current node is a leaf node, producing an instruction to load the current node's operand, otherwise
   (b) if the current node is only a unary operator, recursively calling steps (a) to (c) with the operand of the current node as the current node and then producing an instruction so as to implement the unary operator, otherwise
   (c) performing the steps of:
      (I) recursively calling steps (a) to (c) with a first child of the current node as the current node,
      (II) if a second child of the current node is a leaf node, producing an instruction utilizing the operand of the second child and the current node operator, otherwise
      (III) performing the steps of:
         (1) producing an instruction to push the bounding operand of the second child onto a stack,
         (2) producing an instruction to clear the bounding box of the operand of the second child,
         (3) recursively calling steps (a) to (c) with the operand of the second child as the current node, and
         (4) producing an instruction to apply the reverse of the current operator of the current node to the top of the stack.

9. A method of rendering an image as claimed in claim 1, wherein said instructions comprise one operator or opcode and a maximum of one operand.

10. An apparatus for rendering an image, the apparatus comprising:
   means for creating an expression tree representing the image, wherein the expression tree comprises leaf nodes and group nodes comprising graphical elements and operators, respectively;
   means for converting the expression tree to a corresponding list of instructions;
   means for maintaining an active list of the instructions and graphical elements of those instructions and graphical elements that effect a currently scanned scan line; and
   means for rendering the image on a scan line basis in accordance with the active list of instructions and graphical elements for the currently scanned scan line, wherein said creating means comprises:
   means for optimizing the expression tree by constructing, for each node in the tree, a bounding box of those areas of the graphical elements of the node and its descendent nodes of the expression tree which are active in the production of the image, and wherein the converting means comprises:
   means for generating from the optimized expression tree the list of instructions and graphical elements sorted in scanline order.

11. An apparatus as claimed in claim 10, wherein the group nodes of the expression tree comprise operators for combining corresponding descendant nodes of the expression tree.

12. An apparatus as claimed in claim 10, wherein each of the group nodes of the expression tree stores bounding box information indicative of the boundaries of the graphical elements of children of the group node.

13. An apparatus as claimed in claim 10, wherein each of the leaf nodes of the expression tree stores bounding box information indicative of a portion of a leaf node graphical element which appears in the image.

14. An apparatus as claimed in claim 10, wherein the expression tree is a binary tree.

15. An apparatus as claimed in claim 10, wherein the execution of the operations performed by the maintaining and rendering means is deferred.

16. An apparatus as claimed in claim 15, wherein an execution of the sorting is also deferred.

17. An apparatus as claimed in claim 10, wherein said converting means comprises, for the expression tree, means for assigning a root node of the expression tree to be a current node, and means for performing at least one of the following operations (a) to (c):
   (a) if, on determining that the current node is a leaf node, producing an instruction to load the current node's operand, otherwise
   (b) if, on determining that the current node is only a unary operator, recursively implementing operations (a) to (c) with the operand of the current node as the current node and then producing an instruction so as to implement the unary operator, otherwise
   (c) performing:
      (I) recursively implementing operations (a) to (c) with a first child of the current node as the current node,
      (II) determining if a second child of the current node is a leaf node, and if so, producing an instruction utilizing the operand of the second child and the current node operator, otherwise
      (III) performing:
         (1) producing an instruction to push the bounding operand of the second child onto a stack,
         (2) producing an instruction to clear the bounding box of the operand of the second child,
         (3) recursively implementing operations (a) to (c) with the operand of the second child as the current node, and
         (4) producing an instruction to apply the reverse of the current operator of the current node to the top of the stack.

18. An apparatus as claimed in claim 10, wherein the instructions comprise one operator or opcode and a maximum of one operand.

19. A recording medium having recorded thereon computer code for rendering an image, the code being readable by a computer and comprising steps of:
   creating an expression tree representing the image, wherein the expression tree comprises leaf nodes and group nodes comprising graphical elements and operators, respectively;

converting the expression tree to a corresponding list of instructions;

maintaining an active list of the instructions and graphical elements of those instructions and graphical elements that effect a currently scanned scan line; and rendering the image on a scan line basis in accordance with the active list of instructions and graphical elements for the currently scanned scan line, wherein the creating step includes a step of:

optimizing the expression tree by constructing, for each node in the tree, a bounding box of those areas of the graphical elements of the node and its descendent nodes of the expression tree which are active in the production of the image, and wherein the converting step includes a step of:

generating from the optimized expression tree the list of instructions and graphical elements sorted in scanline order.

* * * * *

UNITED STATES PATENT AND TRADEMARK OFFICE
CERTIFICATE OF CORRECTION

PATENT NO. : 6,236,410 B1
DATED : May 22, 2001
INVENTOR(S) : George Politis et al.

It is certified that error appears in the above-identified patent and that said Letters Patent is hereby corrected as shown below:

Title page,
Insert -- [30] Foreign Application Priority Data
July 25, 1994   (AU)................PM7041 --
Item [56] OTHER PUBLICATIONS, "Fitzpatrick Cella Harper & Scinto" should read -- Fitzpatrick, Cella, Harper & Scinto --.

Column 1,
Line 37, "of" should read -- is --;
Line 38, "0,0,0,1)" should read -- (0,0,0,1) --; and
Line 40, "0,0,0,1)" should read -- (0,0,0,1) --.

Column 3,
Line 53, "increase" should read -- increased --.

Column 5,
Line 57, "objects" should read -- object's --.

Column 6,
Line 59, "is" should be deleted.

Column 7,
Table 2, "circle ( )" should read -- circle ( ); --.

Column 9,
Line 18, "This" should read -- This is --.

Column 11,
Line 20, "support" should read -- supported --.

Column 14,
Line 19, "results" should read -- result --.

Column 17,
Line 6, "as" should be deleted and "state. For" should read -- state, for --; and
Line 32, "their" should read -- its --.

Column 21,
Line 10, "can" should read -- scan --.

UNITED STATES PATENT AND TRADEMARK OFFICE
CERTIFICATE OF CORRECTION

PATENT NO. : 6,236,410 B1
DATED : May 22, 2001
INVENTOR(S) : George Politis et al.

It is certified that error appears in the above-identified patent and that said Letters Patent is hereby corrected as shown below:

Column 22,
Line 18, "optimization" should read -- optimizations --; and
Line 60, "descendent" should read -- descendant --.

Column 24,
Line 5, "descendent" should read -- descendant --.

Column 26,
Line 3, "descendent" should read -- descendant --.

Signed and Sealed this

Fifth Day of March, 2002

Attest:

JAMES E. ROGAN
*Attesting Officer*   *Director of the United States Patent and Trademark Office*